United States Patent
Lee et al.

(10) Patent No.: US 11,336,124 B2
(45) Date of Patent: May 17, 2022

(54) METHOD FOR TRANSMITTING SIGNAL BY WIRELESS POWER TRANSMITTER IN WIRELESS CHARGING SYSTEM, WIRELESS POWER TRANSMITTER AND WIRELESS POWER RECEIVER

(71) Applicant: SAMSUNG ELECTRONICS CO., LTD., Suwon-si (KR)

(72) Inventors: Kyung-Woo Lee, Seoul (KR); Keum-Su Song, Seoul (KR); Hee-Won Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 17/184,160

(22) Filed: Feb. 24, 2021

(65) Prior Publication Data

US 2021/0184506 A1   Jun. 17, 2021

Related U.S. Application Data

(63) Continuation of application No. 16/852,844, filed on Apr. 20, 2020, now Pat. No. 10,944,294, which is a
(Continued)

(51) Int. Cl.
*H02J 50/12* (2016.01)
*H02J 50/80* (2016.01)
(Continued)

(52) U.S. Cl.
CPC .............. *H02J 50/12* (2016.02); *H02J 7/025* (2013.01); *H02J 50/40* (2016.02); *H02J 50/60* (2016.02); *H02J 50/80* (2016.02); *H02J 50/90* (2016.02)

(58) Field of Classification Search
CPC . H01F 38/14; H02J 5/005; H02J 7/025; H02J 17/00; H02J 50/05; H02J 50/10;
(Continued)

(56) References Cited

U.S. PATENT DOCUMENTS

2010/0201201 A1   8/2010   Mobarhan et al.
2011/0221390 A1   9/2011   Won et al.
(Continued)

FOREIGN PATENT DOCUMENTS

CN   102792552   11/2012
CN   102792555   11/2012
(Continued)

OTHER PUBLICATIONS

Alliance for Wireless Power, "A4WP Wireless Power Transfer System Baseline System Specification (BSS)", Version 1.1.2, XP062275929, Nov. 14, 2013, 96 pages.
(Continued)

*Primary Examiner* — Levi Gannon
(74) *Attorney, Agent, or Firm* — Sughrue Mion, PLLC

(57) ABSTRACT

A method of transmitting a signal by a wireless power transmitter in a wireless charging system, wireless power transmitter, and a wireless power receiver are provided. The method includes receiving, from a wireless power transmitter, a first beacon power for a first duration time in every first period; receiving, from the wireless power transmitter, a second beacon power for a second duration time in every second period; if the wireless power receiver determines that an extension of the second beacon power is required, generating load changes while receiving the second beacon power for the second duration time; in response to the generated load changes, continually receiving, from the wireless power transmitter, the second beacon power until a predetermined third duration time, wherein the predeter-
(Continued)

mined third duration time is determined before the second beacon power is transmitted by the wireless power transmitter; and transmitting an advertisement signal to the wireless power transmitter while receiving the second beacon power for the predetermined third duration time.

18 Claims, 16 Drawing Sheets

Related U.S. Application Data continuation of application No. 16/111,904, filed on Aug. 24, 2018, now Pat. No. 10,630,112, which is a continuation of application No. 14/748,977, filed on Jun. 24, 2015, now Pat. No. 10,075,020.

(60) Provisional application No. 62/016,310, filed on Jun. 24, 2014.

(51) Int. Cl.
*H02J 50/90* (2016.01)
*H02J 7/02* (2016.01)
*H02J 50/40* (2016.01)
*H02J 50/60* (2016.01)

(58) Field of Classification Search
CPC .. H02J 50/12; H02J 50/40; H02J 50/60; H02J 50/80; H02J 50/90; H04B 5/0012; H04B 5/0031; H04B 5/0037; H04B 5/0075; H04B 5/0093
USPC ........................................................ 307/104
See application file for complete search history.

(56) References Cited

U.S. PATENT DOCUMENTS

| | | |
|---|---|---|
| 2011/0221391 A1 | 9/2011 | Won et al. |
| 2012/0214536 A1 | 8/2012 | Kim et al. |
| 2012/0223589 A1 | 9/2012 | Low et al. |
| 2012/0262002 A1 | 10/2012 | Widmer et al. |
| 2012/0306284 A1 | 12/2012 | Lee et al. |
| 2012/0309306 A1 | 12/2012 | Kim et al. |
| 2013/0063082 A1 | 3/2013 | Lee et al. |
| 2013/0225077 A1 | 8/2013 | Schultz et al. |
| 2014/0094116 A1 | 4/2014 | Walley et al. |
| 2014/0111018 A1 | 4/2014 | Kwon et al. |
| 2014/0111153 A1 | 4/2014 | Kwon et al. |
| 2014/0159653 A1 | 6/2014 | Von Novak et al. |
| 2014/0191568 A1 | 7/2014 | Partovi |
| 2015/0229135 A1 | 8/2015 | Porat et al. |
| 2016/0336804 A1 | 11/2016 | Son et al. |

FOREIGN PATENT DOCUMENTS

| | | |
|---|---|---|
| CN | 103477566 | 12/2013 |
| CN | 103748764 | 4/2014 |
| KR | 10-2013-0028011 | 3/2013 |
| KR | 10-2013-0119938 A | 11/2013 |
| KR | 10-2014-0050516 A | 4/2014 |
| KR | 10-2014-0050517 A | 4/2014 |
| WO | 2014/061935 | 4/2014 |

OTHER PUBLICATIONS

Chinese Office Action dated Jun. 4, 2018 issued in counterpart application No. 201580034480.6, 14 pages.
European Search Report dated Dec. 20, 2017 issued in counterpart application No. 15812021.2-1804, 13 pages.
International Search Report dated Aug. 28, 2015 issued in counterpart application No. PCT/KR2015/006432, 7 pages.
Communication dated Sep. 23, 2021 issued by the Korean Intellectual Property Office in Korean Application No. 10-2015-0089936.
Communication dated Mar. 21, 2022 by the Korean Intellectual Property Office in Korean Patent Application No. 10-2015-0089936.

METHOD FOR TRANSMITTING SIGNAL BY WIRELESS POWER TRANSMITTER IN WIRELESS CHARGING SYSTEM, WIRELESS POWER TRANSMITTER AND WIRELESS POWER RECEIVER

CROSS-REFERENCE TO RELATED APPLICATIONS

This application is a Continuation Application of U.S. application Ser. No. 16/852,844, which was filed on Apr. 20, 2020 in the U.S. Patent & Trademark Office, and is a Continuation Application of U.S. application Ser. No. 16/111,904, which was filed on Aug. 24, 2018 in the U.S. Patent & Trademark Office (now U.S. Pat. No. 10,630,112 issued Apr. 21, 2020), and is a Continuation Application of U.S. application Ser. No. 14/748,977, which was filed on Jun. 24, 2015 in the U.S. Patent & Trademark Office (now U.S. Pat. No. 10,075,020 issued Sep. 11, 2018), and claims priority under 35 U.S.C. § 119(e) to U.S. Provisional Application No. 62/016,310, which was filed on Jun. 24, 2014 in the U.S. Patent & Trademark Office, the disclosures of which are incorporated by reference herein in their entireties.

BACKGROUND

1. Field

The disclosure relates to wireless charging, and more particularly, to a method for transmitting signals by a wireless power transmitter in a wireless charging system, the wireless power transmitter, and a wireless power receiver.

2. Description of the Related Art

In view of their nature, mobile terminals such as portable phones and Personal Digital Assistants (PDAs) are powered by rechargeable batteries. To charge the batteries, the mobile terminals supply electrical energy to the batteries through separate chargers. Typically, the charger and the battery each have an exterior contact terminal and thus are electrically connected to each other by contacting their contact terminals.

This contact-based charging scheme faces the problem of vulnerability of contact terminals to contamination of foreign materials and the resulting unreliable battery charging because the contact terminals protrude outward. Moreover, if the contact terminals are exposed to moisture, the batteries may not be charged properly.

To address the above problem, wireless charging or contactless charging technologies have recently been developed and applied to many electronic devices.

Such a wireless charging technology is based on wireless power transmission and reception. For example, once a portable phone is placed on a charging pad without being connected to an additional charging connector, its battery is automatically charged. Among wirelessly charged products, wireless electric toothbrushes or wireless electric shavers are well known. The wireless charging technology offers the benefits of increased waterproofness due to wireless charging of electronic products and enhanced portability due to no need for a wired charger for electronic devices. Further, it is expected that various relevant wireless charging technologies will be further developed in the upcoming era of electric vehicles.

There are mainly three wireless charging schemes: an electromagnetic induction scheme using coils, a resonance-based scheme, and a Radio Frequency (RF)/microwave radiation scheme based on the conversion of electrical energy to microwaves.

To date, the electromagnetic induction-based wireless charging scheme is most popular. However, considering recent successful experiments in wireless power transmission over microwaves at a distance of tens of meters in Korea and in other overseas countries, it is foreseeable that every electronic product will be charged wirelessly at any time in any place in the near future.

Electromagnetic induction-based power transmission refers to power transfer between primary and secondary coils. When a magnet moves around a coil, a current is induced. Based on this principle, a transmitter generates a magnetic field and a receiver produces energy by a current induced by a change in the magnetic field. This phenomenon is called magnetic induction and power transmission based on magnetic induction is highly efficient in energy transfer.

Regarding resonance-based wireless charging, a system was suggested for wireless energy transfer from a charger at a distance of a few meters based on the resonance-based power transmission principle by the coupled mode theory. Electromagnetic waves were resonated to carry electrical energy, instead of sound. The resonant electrical energy is directly transferred only in the presence of a device having the same resonant frequency, while the unused electrical energy is reabsorbed into the electromagnetic field rather being dispersed in the air. Thus, the resonant electrical energy does not affect nearby machines or human beings, as compared to other electrical waves.

A method in which a wireless power transmitter (or a Power Transmitting Unit (PTU)) detects or determines whether a wireless power receiver (or Power Receiving Unit (PRU)) is placed thereon may include a method of detecting a change in impedance of a power transmission unit included in the wireless power transmitter.

If a wireless power transmitter (PTU) detects the presence of a wireless power receiver (PRU) through an impedance change detection and the like, the wireless power transmitter may initiate communication with the wireless power receiver by supplying the power with which the wireless power receiver can perform communication.

For example, in accordance with the wireless power standard of Alliance for Wireless Power (A4WP), a wireless power transmitter may transmit a long-beacon signal, and upon receiving the long-beacon signal, a wireless power receiver may transmit an advertisement signal to the wireless power transmitter within a predetermined time, thereby proceeding with a registration procedure for wireless charging.

However, where a boot procedure for operating a processor is required while the battery power of the wireless power receiver is low or depleted or the wireless power receiver is powered off, the wireless power receiver may not transmit the advertisement signal to the wireless power transmitter within a predetermined time. If the wireless power receiver cannot transmit the advertisement signal within a predetermined time in this way, the normal registration procedure may not be performed, so wireless charging for the wireless power receiver may not be possible.

SUMMARY

The present invention has been made to address at least the above-mentioned problems and/or disadvantages and to provide at least the advantages described below.

Accordingly, an aspect of the present invention is to provide a signal transmission method in which if a wireless power transmitter detects a load change before its transmission of a long-beacon signal is terminated, the wireless power transmitter may extend a transmission period of the long-beacon signal to receive an advertisement signal in a wireless charging system, and to provide a wireless power transmitter and a wireless power receiver.

Another aspect of the present invention is to provide a signal transmission method in which if a wireless power transmitter receives a beacon extension request signal before its transmission of a long-beacon signal is terminated, the wireless power transmitter may extend a transmission period of the long-beacon signal to receive an advertisement signal in a wireless charging system, and to provide a wireless power transmitter and a wireless power receiver.

In accordance with an aspect of the present invention, there is provided a method, which includes receiving, from a wireless power transmitter, a first beacon power for a first duration time in every first period; receiving, from the wireless power transmitter, a second beacon power for a second duration time in every second period; if the wireless power receiver determines that an extension of the second beacon power is required, generating load changes while receiving the second beacon power for the second duration time; in response to the generated load changes, continually receiving, from the wireless power transmitter, the second beacon power until a predetermined third duration time, wherein the predetermined third duration time is determined before the second beacon power is transmitted by the wireless power transmitter; and transmitting an advertisement signal to the wireless power transmitter while receiving the second beacon power for the predetermined third duration time.

In accordance with another aspect of the present invention, there is provided a wireless power receiver. The wireless power receiver includes a communication unit; a power receiving unit configured to receive a first beacon power for a first duration time in every first period and receive a second beacon power for a second duration time in every second period, from a wireless power transmitter; a load generating circuit configured to generate load changes while receiving the second beacon power for the second duration time, if the wireless power receiver determines that an extension of the second beacon power is required; and a controller configured to in response to the generated load changes, control the power receiving unit to continually receive, from the wireless power transmitter, the second beacon power until a predetermined third duration time, wherein the predetermined third duration time is determined before the second beacon power is transmitted by the wireless power transmitter, and control the communication unit to transmit an advertisement signal to the wireless power transmitter while receiving the second beacon power for the predetermined third duration time.

BRIEF DESCRIPTION OF THE DRAWINGS

The above and other aspects, features and advantages will be more apparent from the following description of embodiments, taken in conjunction with the accompanying drawings, in which.

DETAILED DESCRIPTION

Figure 1:
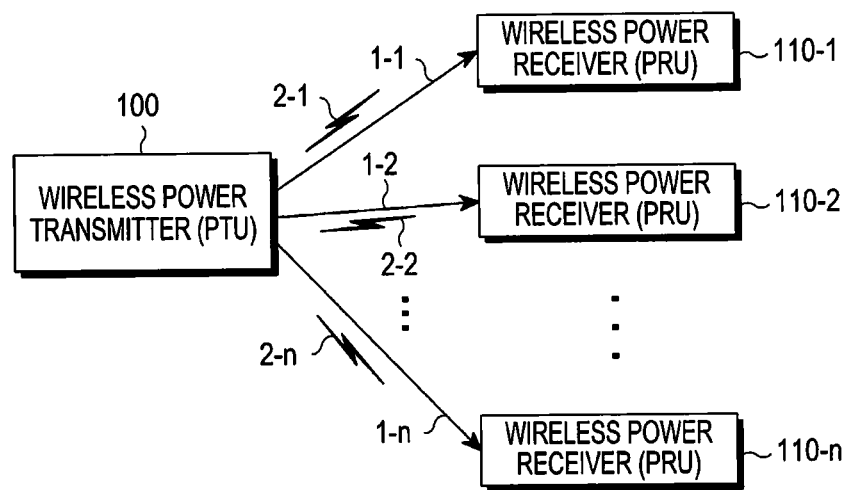
FIG. 1 is a block diagram of an overall operation of a wireless charging system.

The following description with reference to the accompanying drawings is provided to assist in a comprehensive understanding of the present invention as defined by the appended claims and their equivalents. Throughout the drawings, like reference numerals will be understood to refer to like parts, components, and structures. It includes various details to assist in that understanding but these are to be regarded as merely exemplary. Accordingly, those of ordinary skilled in the art will recognize that various changes and modifications of the embodiments of the present invention described herein can be made without departing from the scope and spirit of the present invention. In addition, descriptions of well-known functions and constructions may be omitted for clarity and conciseness.

The terms and words used in the following description and claims are not limited to their dictionary meanings, but, are merely used to enable a clear and consistent understanding of the present invention. Accordingly, it should be apparent to those skilled in the art that the following description of embodiments of the present invention is provided for illustration purpose only and not for the purpose of limiting the present invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The term "substantially" indicates that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

A description will first be given of the concept of a wireless charging system applicable to embodiments of the present invention with reference to FIGS. 1 to 11, followed by a detailed description of a method for transmitting a signal by a wireless power transmitter in a wireless charging system and of a wireless power transmitter and a wireless power receiver according to various embodiments of the present invention with reference to FIGS. 12 to 17.

FIG. 1 is a block diagram of an overall operation of a wireless charging system.

Referring to FIG. 1, the wireless charging system includes a wireless power transmitter (or Power Transmitting Unit (PTU)) 100 and one or more wireless power receivers (or Power Receiving Units (PRUs)) 110-1, 110-2, . . . , and 110-n.

The wireless power transmitter 100 may wirelessly transmit power 1-1, 1-2, . . . , and 1-n respectively to the wireless power receivers 110-1, 110-2, . . . , and 110-n. In addition, the wireless power transmitter 100 may wirelessly transmit the power 1-1, 1-2, . . . , and 1-n only to wireless power receivers that have been authenticated in a predetermined authentication procedure.

The wireless power transmitter 100 may establish electrical connections to the wireless power receivers 110-1, 110-2, . . . , and 110-n. For example, the wireless power transmitter 100 may transmit wireless power in the form of electromagnetic waves to the wireless power receivers 110-1, 110-2, . . . , and 110-n.

The wireless power transmitter 100 may conduct bi-directional communication with the wireless power receivers 110-1, 110-2, . . . , and 110-n. The wireless power transmitter 100 and the wireless power receivers 110-1, 110-2, . . . , and 110-n may process or transmit/receive packets 2-1, 2-2, . . . , and 2-n configured in predetermined frames. The frames are described below in greater detail. A wireless power receiver may be configured as a mobile communication terminal, a Personal Digital Assistant (PDA), a Personal Multimedia Player (PMP), a smartphone, or the like.

The wireless power transmitter 100 may apply power wirelessly to the plurality of wireless power receivers 110-1, 110-2, . . . , and 110-n. For example, the wireless power transmitter 100 may transmit power to the plurality of wireless power receivers 110-1, 110-2, . . . , and 110-n by resonance. If the wireless power transmitter 100 employs the resonance scheme, the distance between the wireless power transmitter 100 and the wireless power receivers 110-1, 110-2, . . . , and 110-n may be preferably 30 m or less. If the wireless power transmitter 100 employs an electromagnetic induction scheme, the distance between the wireless power transmitter 100 and the wireless power receivers 110-1, 110-2, . . . , and 110-n may be preferably 10 cm or less.

The wireless power receivers 110-1, 110-2, . . . , and 110-n may receive wireless power from the wireless power transmitter 100 and charge their internal batteries. Further, the wireless power receivers 110-1, 110-2, . . . , and 110-n may each transmit to the wireless power transmitter 100 a signal requesting wireless power transmission, information required for wireless power reception, wireless power receiver state information, or control information for the wireless power transmitter 100. Information on the transmitted signal is described below in greater detail.

Each of the wireless power receivers 110-1, 110-2, . . . , and 110-n may also transmit a message indicating its charged state to the wireless power transmitter 100.

The wireless power transmitter 100 may include a display means such as a display and may display the state of each wireless power receiver 110-1, 110-2, . . . , and 110-n based on the messages received from the wireless power receivers 110-1, 110-2, . . . , and 110-n. Further, the wireless power transmitter 100 may display the time that is expected until each of the wireless power receivers 110-1, 110-2, . . . , and 110-n is completely charged.

The wireless power transmitter 100 may transmit a control signal for disabling a wireless charging function to the wireless power receivers 110-1, 110-2, . . . , and 110-n. Upon receipt of the control signal for disabling the wireless charging function from the wireless power transmitter 100, a wireless power receiver may disable the wireless charging function.

Figure 2:
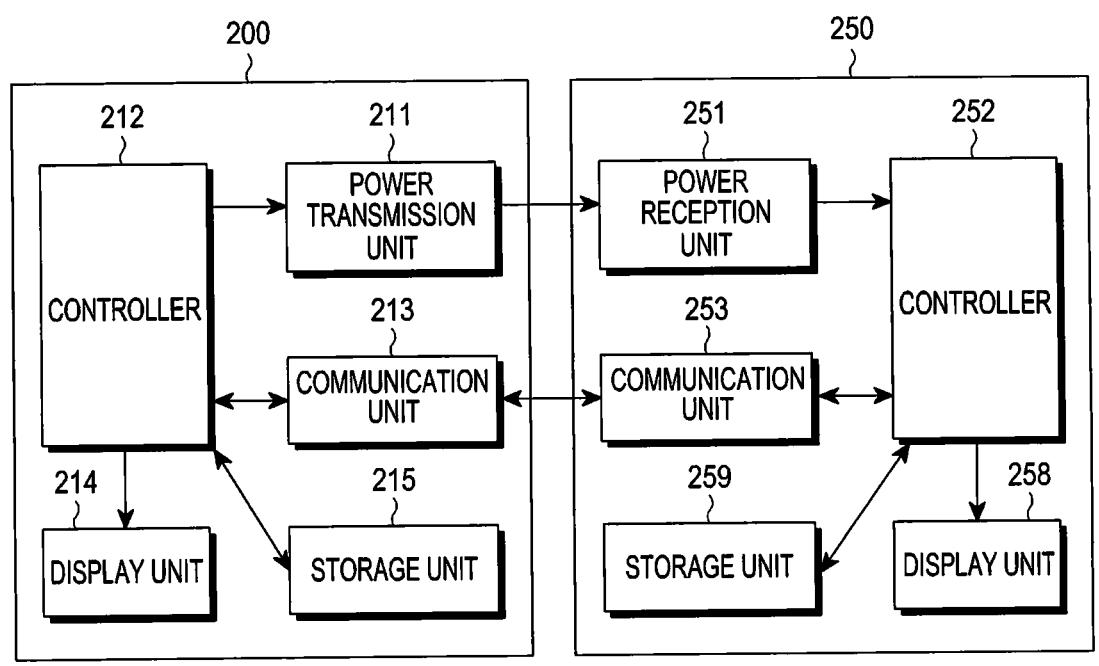
FIG. 2 is a block diagram of a wireless power transmitter and a wireless power receiver according to an embodiment of the present invention.

FIG. 2 is a block diagram of a wireless power transmitter and a wireless power receiver according to an embodiment of the present invention.

Referring to FIG. 2, a wireless power transmitter 200 may include at least one of a power transmission unit 211, a controller 212, a communication unit 213, a display unit 214, and a storage unit 215.

The power transmission unit 211 may supply power required by the wireless power transmitter 200 and may wirelessly supply power to a wireless power receiver 250. The power transmission unit 211 may supply power in the form of Alternating Current (AC) waveforms or by converting power in Direct Current (DC) waveforms to power in AC waveforms by means of a converter. The power transmission unit 211 may be implemented as a built-in battery. Alternatively, the power transmission unit 211 may be implemented as a power reception interface so as to receive power externally and supply the power to other components. It will be understood by those skilled in the art that as far as it can supply power in AC waveforms, any means may be used as the power transmission unit 211.

The controller 212 may provide overall control to the wireless power transmitter 200. The controller 212 may control an overall operation of the wireless power transmitter 200 using an algorithm, a program, or an application required for a control operation, read from the storage unit 215. The controller 212 may be implemented as a Central Processing Unit (CPU), a microprocessor, or a mini computer.

The communication unit 213 may communicate with the wireless power receiver 250 in a predetermined communication scheme. The communication unit 213 may receive power information from the wireless power receiver 250. The power information may include information about at least one of the capacity, residual battery amount, the number of charging, use amount, battery capacity, and battery proportion of the wireless power receiver 250.

Further, the communication unit 213 may transmit a charging function control signal for controlling the charging function of the wireless power receiver 250. The charging function control signal may be a control signal that enables or disables the charging function by controlling a power reception unit 251 of the specific wireless power receiver 250. In addition, the power information may include information about insertion of a wired charging terminal, transition from a Stand Alone (SA) mode to a Non-Stand Alone (NSA) mode, error state release, and the like, as described below in detail.

In addition, the charging function control signal may include information related to power control or a power control command to cope with an occurrence of an abnormality according to an embodiment of the present invention.

The communication unit 213 may receive a signal from another wireless power transmitter as well as the wireless power receiver 250. For example, the communication unit 213 may proceed with a registration procedure for wireless charging by receiving an advertisement signal transmitted from a communication unit 253 of the wireless power receiver 250.

The controller 212 may display a state of the wireless power receiver 250 on the display unit 214 based on a message received from the wireless power receiver 250 through the communication unit 213. Further, the controller 212 may display on the display unit 214 the time that is expected until the wireless power receiver 250 is completely charged.

As illustrated in FIG. 2, the wireless power receiver 250 may include at least one of a power reception unit 251, a controller 252, a communication unit 253, a display unit 258, and a storage unit 259.

The power reception unit 251 may receive power wirelessly from the wireless power transmitter 200. The power reception unit 251 may receive power in the form of AC waveforms from the wireless power transmitter 200.

The controller 252 may provide overall control to the wireless power receiver 250. The controller 252 may control an overall operation of the wireless power receiver 250 using an algorithm, a program, or an application required for a control operation, read from the storage unit 259. The controller 252 may be implemented as a CPU, a microprocessor, or a mini computer.

The communication unit 253 may communicate with the wireless power transmitter 200 in a predetermined communication scheme. The communication unit 253 may transmit power information to the wireless power transmitter 200. The power information may include information about at least one of the capacity, residual battery amount, the number of charging, use amount, battery capacity, and battery proportion of the wireless power receiver 250.

Further, the communication unit 253 may transmit a charging function control signal for controlling the charging function of the wireless power receiver 250. The charging function control signal may be a control signal that enables or disables the charging function by controlling the power reception unit 251 of the wireless power receiver 250. Alternatively, the power information may include information about insertion of a wired charging terminal, transition from the SA mode to the NSA mode, error state release, and the like, as described below in detail. Further, the charging function control signal may include information related to power control or a power control command to cope with an occurrence of an abnormality according to an embodiment of the present invention.

Moreover, the communication unit 253 may receive a beacon signal transmitted from the power transmission unit 211 of the wireless power transmitter 200 through the power reception unit 251, and transmit an advertisement signal to the wireless power transmitter 200 within a predetermined time, thereby proceeding with a registration procedure for wireless charging.

The controller 252 may display a state of the wireless power receiver 250 on the display unit 258. Further, the controller 252 may display on the display unit 258 the time that is expected until the wireless power receiver 250 is completely charged.

Figure 3:
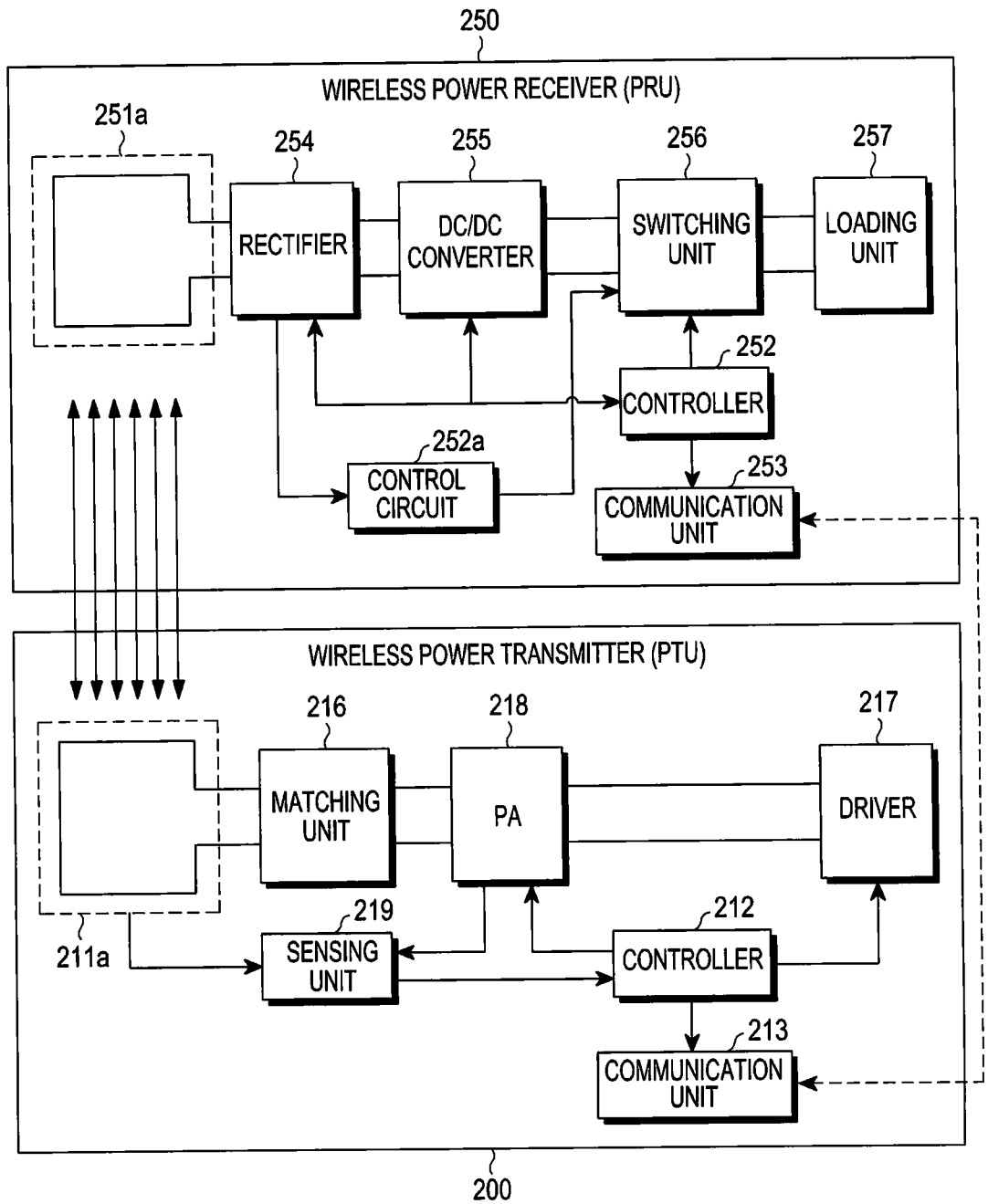
FIG. 3 is a block diagram of a wireless power transmitter and a wireless power receiver according to an embodiment of the present invention.

FIG. 3 is a detailed block diagram of a wireless power transmitter and a wireless power receiver according to an embodiment of the present invention.

Referring to FIG. 3, the wireless power transmitter 200 may include at least one of a Transmission (Tx) resonator 211a, the controller 212 (for example, a Micro Controller Unit (MCU)), the communication unit 213 (for example, an out-of-band signaling unit), a matching unit 216, a driver (e.g. power supply) 217, a Power Amplifier (PA) 218, and a sensing unit 219. The wireless power receiver 250 may include at least one of a Reception (Rx) resonator 251a, the controller 252, a control circuit 252a, the communication unit 253, a rectifier 254, a DC/DC converter 255, a switching unit 256, and a loading unit (or a client device load) 257.

The driver 217 may output DC power having a predetermined voltage value. The voltage value of the DC power output from the driver 217 may be controlled by the controller 212.

A DC current output from the driver 217 may be applied to the PA 218. The PA 218 may amplify the DC current with a predetermined gain. Further, the PA 218 may convert DC power to AC power based on a signal received from the controller 212. Therefore, the PA 218 may output AC power.

The matching unit 216 may perform impedance matching. For example, the matching unit 216 may control the impedance viewed from the matching unit 216 so that its output power may have high efficiency or high power. The sensing unit 219 may sense a load change by the wireless power receiver 250 through the Tx resonator 211a or the PA 218 and may provide the sensing result to the controller 212.

According to an embodiment of the present invention, when the wireless power transmitter 200 transmits a short-beacon signal or a long-beacon signal to the wireless power receiver 250, the wireless power receiver 250 may generate a load change by means of a predetermined circuit and the like. The sensing unit 219 of the wireless power transmitter 200 may detect a load change of the wireless power receiver 250, and provide the load change detection results to the controller 212. According to an embodiment of the present invention, the controller 212 may detect the presence of the wireless power receiver 250 or may extend or adjust a transmission period of the beacon signal (e.g., the long-beacon signal), based on the load change detected by the sensing unit 219.

The matching unit 216 may adjust impedance under control of the controller 212. The matching unit 216 may include at least one of a coil and a capacitor. The controller 212 may control a connection to at least one of the coil and the capacitor and thus may perform impedance matching accordingly.

The Tx resonator 211a may transmit input AC power to the Rx resonator 251a. The Tx resonator 211a and the Rx resonator 251a may be implemented as resonant circuits having the same resonant frequency. For example, the resonant frequency may be determined to be 6.78 MHz.

The communication unit 213 may communicate with the communication unit 253 of the wireless power receiver 250, for example, bi-directionally at a frequency of 2.4 GHz (by Wireless Fidelity (WiFi), ZigBee, or Bluetooth (BT)/Bluetooth Low Energy (BLE)).

The Rx resonator 251a may receive power for charging. Further, the Rx resonator 251a may receive a beacon signal (e.g., a short-beacon signal or a long-beacon signal) transmitted through the Tx resonator 211a of the wireless power transmitter 200.

The rectifier 254 may rectify wireless power received from the Rx resonator 251a to DC power. For example, the rectifier 254 may be implemented in the form of a diode bridge. The DC/DC converter 255 may convert the rectified power with a predetermined gain. For example, the DC/DC converter 255 may convert the rectified power so that the voltage of its output may be 5V. A minimum voltage value and a maximum voltage value that may be applied to the input of the DC/DC converter 255 may be preset.

The switching unit 256 may connect the DC/DC converter 255 to the loading unit 257. The switching unit 256 may be kept in an ON or OFF state under the control of the controller 252. The switching unit 256 is optional. If the switching unit 256 is in the ON state, the loading unit 257 may store the converted power received from the DC/DC converter 255.

According to an embodiment of the present invention, the control circuit 252*a* may generate a control signal for controlling the switching unit 256 based on the signal received through the Rx resonator 251*a* of the wireless power receiver 250. For example, the control circuit 252*a*, unlike the controller 252, is driven by the signal (e.g., a short-beacon signal or a long-beacon signal) received at the wireless power receiver 250, so the control circuit 252*a* may generate a load change by controlling the switching unit 256. According to an embodiment of the present invention, as the control circuit 252*a* is provided as described above, a load change of the wireless power receiver 250 may be generated even though no power is supplied to the controller 252 or the controller 252 is disabled.

Further, according to an embodiment of the present invention, the control circuit 252*a* may generate a code or a signal of a predetermined pattern based on the signal received (e.g., a short-beacon signal or a long-beacon signal) received through the Rx resonator 251*a* of the wireless power receiver 250. The load switch (e.g., the switching unit 256) may be controlled by the code or signal generated in the control circuit 252*a*, making it possible to generate a load change corresponding to a predetermined code or signal. The wireless power transmitter 200 may detect a load change of the wireless power receiver 250 and decode a predetermined code or signal, thereby obtaining predetermined information (e.g., information relating to the extension of a beacon signal period).

Figure 4:
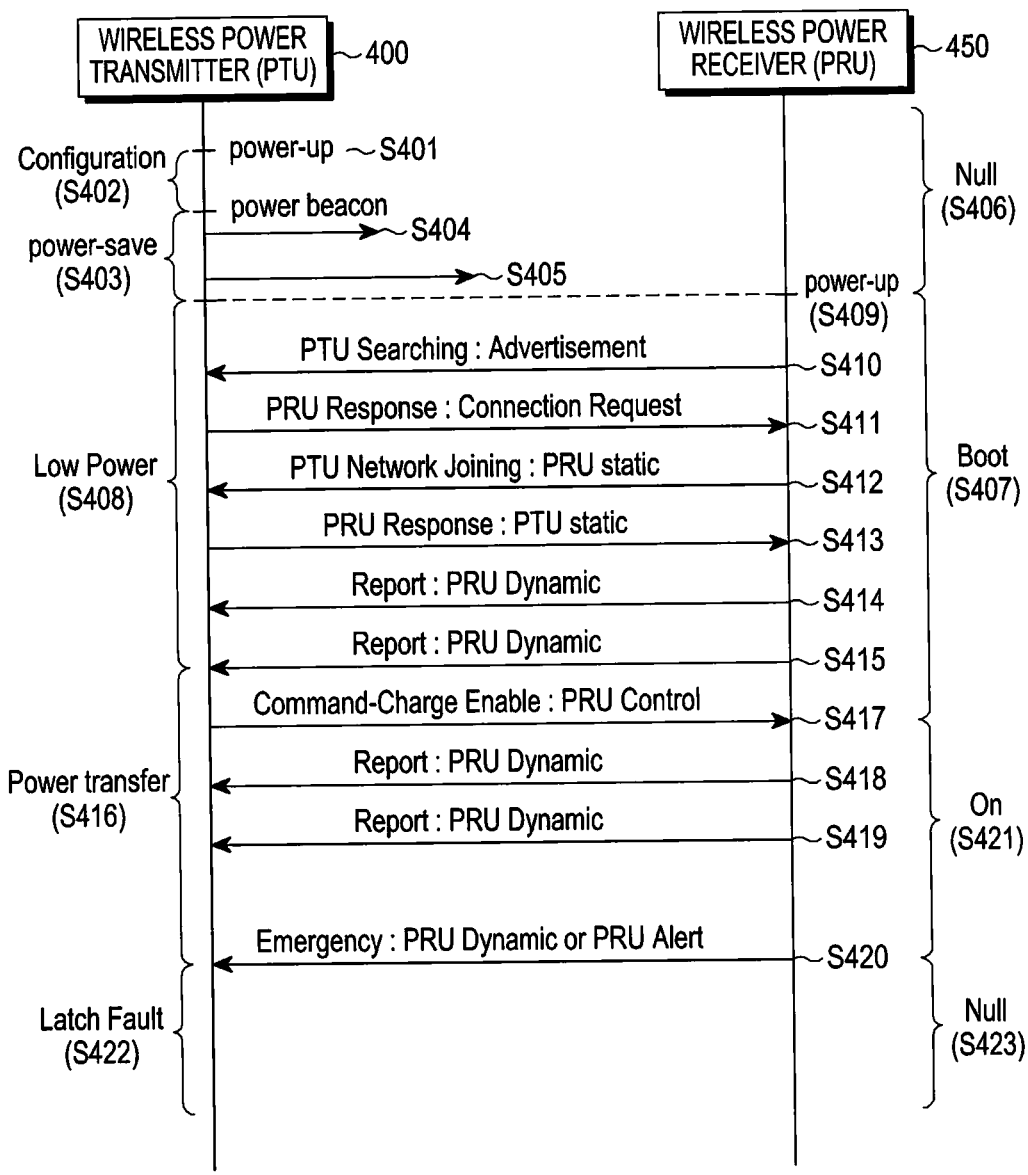
FIG. 4 is a flow diagram of a signal flow for operations of a wireless power transmitter and a wireless power receiver according to an embodiment of the present invention.

FIG. 4 is a flow diagram of a signal flow for operations of a wireless power transmitter and a wireless power receiver according to an embodiment of the present invention.

Referring to FIG. 4, a wireless power transmitter 400 may be powered on in step S401. Upon power-on, the wireless power transmitter 400 may configure an environment in step S402.

The wireless power transmitter 400 may enter a power save mode in step S403. In the power save mode, the wireless power transmitter 400 may apply different types of power beacons for detection, with their respective periods, which are described below in greater detail with reference to FIG. 6. For example, the wireless power transmitter 400 may transmit power beacons S404 and S405 for detection (for example, short beacons or long beacons) and the power beacons S404 and S405 may have different power values. One or both of the power beacons S404 and S405 for detection may have sufficient power to drive the communication unit of a wireless power receiver 450. For example, the wireless power receiver 450 may communicate with the wireless power transmitter 400 by driving its communication unit by means of one or both of the power beacons S404 and S405 for detection. This state may be referred to as a null state.

The wireless power transmitter 400 may detect a load change as the wireless power receiver 450 is placed on the wireless power transmitter 400. The wireless power transmitter 400 may enter a low power mode in step S408. The low power mode is described below in greater detail with reference to FIG. 6. The wireless power receiver 450 may drive its communication unit based on the power received from the wireless power transmitter 400 in step S409.

The wireless power receiver 450 may transmit a PTU searching signal to the wireless power transmitter 400 in step S410. The wireless power receiver 450 may transmit the PTU searching signal as a BLE-based Advertisement (AD) signal. The wireless power receiver 450 may transmit the PTU searching signal periodically until it receives a response signal from the wireless power transmitter 400 or a predetermined time period lapses.

Upon receipt of the PTU searching signal from the wireless power receiver 450, the wireless power transmitter 400 may transmit a PRU response signal in step S411. The PRU response signal may establish a connection between the wireless power transmitter 400 and the wireless power receiver 450.

The wireless power receiver 450 may transmit a PRU static signal in step S412. The PRU static signal may indicate a state of the wireless power receiver 450 and may request joining in a wireless power network managed by the wireless power transmitter 400.

The wireless power transmitter 400 may transmit a PTU static signal in step S413. The PTU static signal transmitted by the wireless power transmitter 400 may indicate capabilities of the wireless power transmitter 400.

After the wireless power transmitter 400 and the wireless power receiver 450 transmit and receive the PRU static signal and the PTU static signal, the wireless power receiver 450 may transmit a PRU dynamic signal periodically in steps S414 and S415. The PRU dynamic signal may include at least one parameter measured by the wireless power receiver 450. For example, the PRU dynamic signal may include information about a voltage at the output of a rectifier of the wireless power receiver 450. The state of the wireless power receiver 450 may be referred to as a boot state in step S407.

The wireless power transmitter 400 enters a power transfer mode in step S416. The wireless power transmitter 400 may transmit a PRU control signal or a command signal for enabling charging to the wireless power receiver 450 in step S417. In the power transfer mode, the wireless power transmitter 400 may transmit charging power.

The PRU control signal transmitted by the wireless power transmitter 400 may include information that enables/disables charging of the wireless power receiver 450 and permission information. The PRU control signal may be transmitted each time a charged state is changed. For example, the PRU control signal may be transmitted every 250 ms or upon an occurrence of a parameter change. The PRU control signal may be configured to be transmitted within a predetermined threshold time, for example, within 1 second, even though no parameter is changed.

The wireless power receiver 450 may change settings according to the PRU control signal and transmit a PRU dynamic signal to report a state of the wireless power receiver 450 in steps S418 and S419. The PRU dynamic signal transmitted by the wireless power receiver 450 may include information about at least one of a voltage, a current, a wireless power receiver state, and a temperature. The state of the wireless power receiver 450 may be referred to as an ON state.

The PRU dynamic signal may have the following data structure illustrated in Table 1 below.

TABLE 1

| Field | Octets | Description | Use | Units |
|---|---|---|---|---|
| Optional fields | 1 | Defines which optional fields are populated | Mandatory | |
| $V_{RECT}$ | 2 | Voltage at diode output | Mandatory | mV |
| $I_{RECT}$ | 2 | Current at diode output | Mandatory | mA |
| $V_{OUT}$ | 2 | Voltage at charge/battery port | Optional | mV |
| $I_{OUT}$ | 2 | Current at charge/battery port | Optional | mA |
| Temperature | 1 | Temperature of PRU | Optional | Deg C. from −40 C. |
| $V_{RECT\_MIN\_DYN}$ | 2 | $V_{RECT\_LOW\_LIMIT}$(dynamic value) | Optional | mV |
| $V_{RECT\_SET\_DYN}$ | 2 | Desired $V_{RECT}$(dynamic value) | Optional | mV |
| $V_{RECT\_HIGH\_DYN}$ | 2 | $V_{RECT\_HIGH\_LIMIT}$(dynamic value) | Optional | mV |
| PRU alert | 1 | Warnings | Mandatory | Bit field |
| RFU | 3 | Undefined | | |

Referring to Table 1 above, the PRU dynamic signal may include one or more fields. The fields may provide optional field information, information about a voltage at the output of the rectifier of the wireless power receiver 450, information about a current at the output of the rectifier of the wireless power receiver 450, information about a voltage at the output of the DC/DC converter of the wireless power receiver 450, information about a current at the output of the DC/DC converter of the wireless power receiver 450, temperature information, information about a minimum voltage value $V_{RECT\_MIN\_DYN}$ at the output of the rectifier of the wireless power receiver 450, information about an optimum voltage value $V_{RECT\_SET\_DYN}$ at the output of the rectifier of the wireless power receiver 450, information about a maximum voltage value $V_{RECT\_HIGH\_DYN}$ at the output of the rectifier of the wireless power receiver 450, and warning information (e.g. PRU alert). The PRU dynamic signal may include at least one of the above fields.

For example, at least one voltage set value that has been determined according to a charging situation (for example, the information about a minimum voltage value $V_{RECT\_MIN\_DYN}$ at the output of the rectifier of the wireless power receiver 450, the information about an optimum voltage value $V_{RECT\_SET\_DYN}$ at the output of the rectifier of the wireless power receiver 450, and the information about a maximum voltage value $V_{RECT\_HIGH\_DYN}$ at the output of the rectifier of the wireless power receiver 450) may be transmitted in the at least one field of the PRU dynamic signal. Upon receipt of the PRU dynamic signal, the wireless power transmitter 400 may adjust a wireless charging voltage to be transmitted to each wireless power receiver 450 based on the voltage value set in the PRU dynamic signal.

Among the fields, PRU alert may be configured in the data structure illustrated in Table 2 below.

TABLE 2

| 7 | 6 | 5 | 4 | 3 | 2 | 1 | 0 |
|---|---|---|---|---|---|---|---|
| Overvoltage | Overcurrent | Overtemp | Charge complete | TA detect | Transition | restart request | RFU |

Referring to Table 2 above, PRU alert may include a bit for restart request, a bit for transition, and a bit for Travel Adapter (TA) detect. The TA detect bit indicates that a wireless power receiver 450 has been connected to a wired charging terminal in the wireless power transmitter 400 that provides wireless charging. The transition bit informs the wireless power transmitter 400 that the wireless power receiver 450 is reset before a communication Integrated Circuit (IC) of the wireless power receiver 450 transitions from the SA mode to the NSA mode. Finally, the restart request bit indicates that the wireless power transmitter 400 is ready to resume charging of the wireless power receiver 450, when the wireless power transmitter 400 that has discontinued charging by reducing transmission power due to overcurrent or overtemperature returns to a normal state.

PRU alert may also be configured in the data structure illustrated in Table 3 below.

TABLE 3

| 7 | 6 | 5 | 4 | 3 | 2 | 1 | 0 |
|---|---|---|---|---|---|---|---|
| PRU overvoltage | PRU overcurrent | PRU overtemperature | PRU Self Protection | Charge Complete | Wired Charger Detect | Mode Transition Bit 1 | Mode Transition Bit 0 |

Referring to Table 3 above, PRU alert may include the fields of overvoltage, overcurrent, overtemperature, PRU Self Protection, Charge Complete, Wired Charger Detect, and Mode Transition. If the overvoltage field is set to "1," this may imply that the voltage Vrect of the wireless power receiver 450 has exceeded an overvoltage limit. The overcurrent and overtemperature fields may be set in the same manner as the overvoltage field. PRU Self Protection indicates that the wireless power receiver 450 protects itself by directly reducing power across a load. In this case, the wireless power transmitter 400 does not need to change a charged state.

According to an embodiment of the present invention, bits for Mode Transition may be set to a value for notifying the wireless power transmitter 400 of the duration of a mode transition. The Mode Transition bits may be configured as illustrated in Table 4 below.

TABLE 4

| Value(Bit) | Mode Transition Bit Description |
|---|---|
| 00 | No Mode Transition |
| 01 | 2 s Mode Transition time limit |
| 10 | 3 s Mode Transition time limit |
| 11 | 6 s Mode Transition time limit |

Referring to Table 4 above, if the Mode Transition bits are set to "00," this may indicate no mode transition. If the Mode Transition bits are set to "01," this may indicate that a time limit for completion of a mode transition is 2 seconds. If the Mode Transition bits are set to "10," this may indicate that the time limit for completion of a mode transition is 3 seconds. If the Mode Transition bits are set to "11," this may indicate that the time limit for completion of a mode transition is 6 seconds.

For example, if a mode transition takes 3 seconds or less, the Mode Transition bits may be set to "10." Before starting a mode transition, the wireless power receiver 450 may ensure that no impedance change will occur during the mode transition by changing an input impedance setting to match a 1.1 W power draw. Accordingly, the wireless power transmitter 400 adjusts power ITX_COIL for the wireless power receiver 450 according to this setting and thus may maintain the power ITX_COIL for the wireless power receiver 450 during the mode transition.

Therefore, after a mode transition duration is set by the Mode Transition bits, the wireless power transmitter 400 may maintain the power ITX_COIL for the wireless power receiver 450 during the mode transition duration, for example, for 3 seconds. In other words, even though the wireless power transmitter 400 does not receive a response from the wireless power receiver 450 for 3 seconds, the wireless power transmitter 400 may maintain a connection to the wireless power receiver 450. However, after the mode transition duration lapses, the wireless power transmitter 400 may end the power transmission, considering that the wireless power receiver 450 is a rogue object.

The wireless power receiver 450 may sense an occurrence of an error. The wireless power receiver 450 may transmit a warning signal to the wireless power transmitter 400 in step S420. The warning signal may be transmitted as a PRU dynamic signal or an alert signal. For example, the wireless power receiver 450 may transmit the PRU alert field illustrated in Table 1 above to indicate an error state to the wireless power transmitter 400. Alternatively, the wireless power receiver 450 may transmit a stand-alone warning signal indicating an error state to the wireless power transmitter 400. Upon receipt of the warning signal, the wireless power transmitter 400 may enter a latch fault mode in step S422. The wireless power receiver 450 may enter a null state in step S423.

Figure 5:
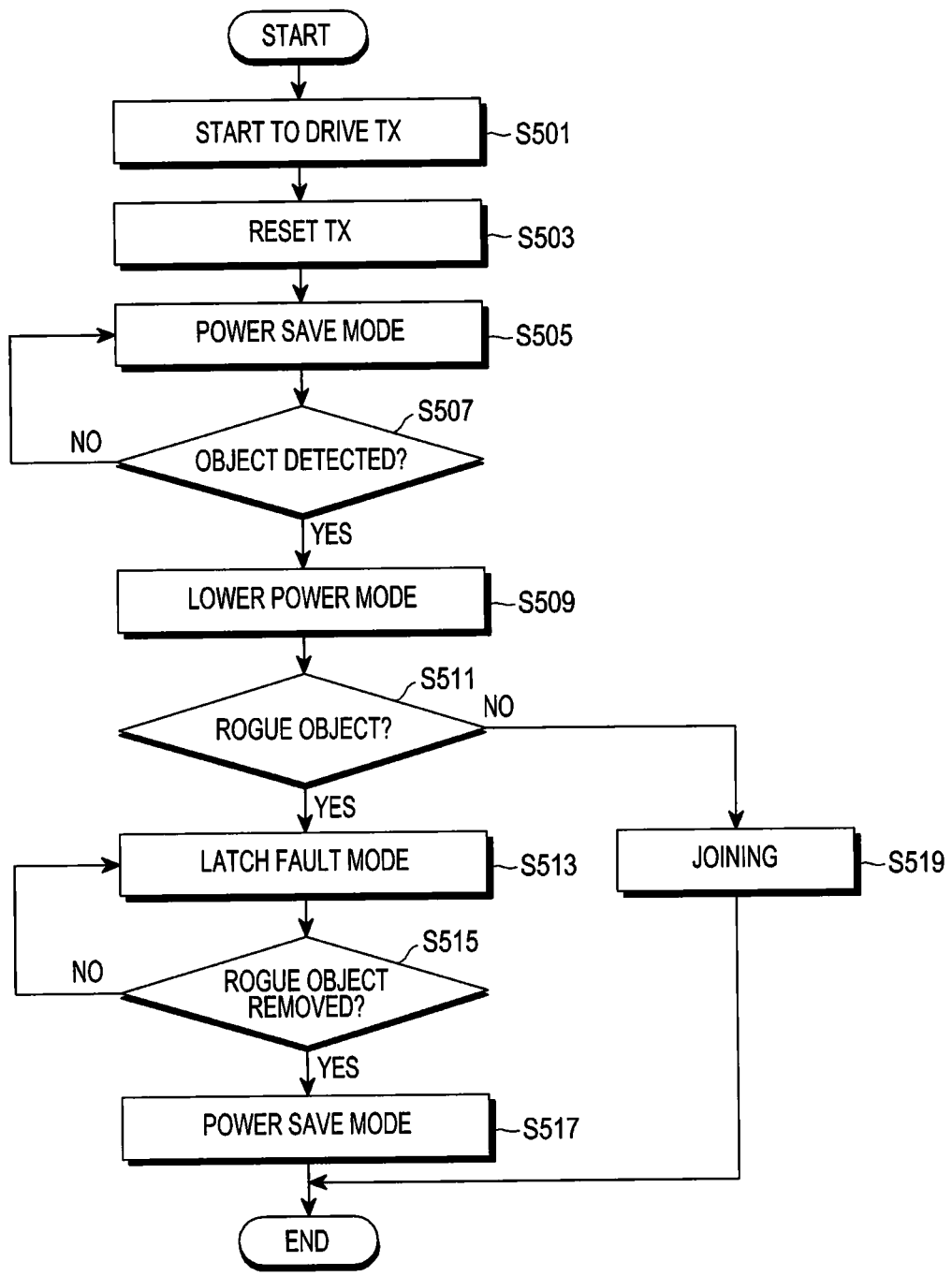
FIG. 5 is a flowchart of a method of a wireless power transmitter and a wireless power receiver according to an embodiment of the present invention.
Figure 6:
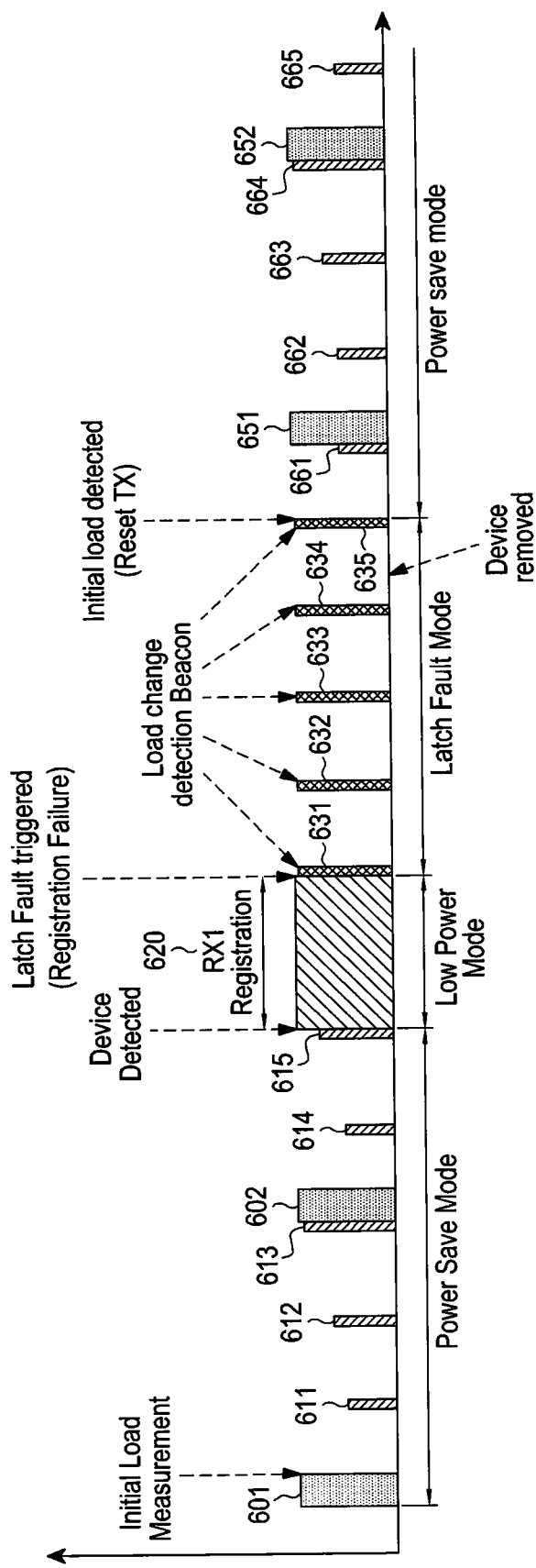
FIG. 6 is a graph illustrating amounts of power applied by a wireless power transmitter with respect to a time axis according to an embodiment of the present invention.

FIG. 5 is a flowchart of a method of a wireless power transmitter and a wireless power receiver according to another embodiment of the present invention. The control method in FIG. 5 is described in detail with reference to FIG. 6. FIG. 6 is a graph illustrating amounts of power applied by a wireless power transmitter 400 with respect to a time axis in accordance with FIG. 5.

Referring to FIG. 5, the wireless power transmitter 400 may start to operate in step S501. Further, the wireless power transmitter 400 may reset an initial setting in step S503 and may enter the power save mode in step S505. The wireless power transmitter 400 may apply different types of power having different power amounts to the power transmission unit in the power save mode. For example, the wireless power transmitter may apply second detection power 601 and 602 and third detection power 611 to 615 to the power transmission unit in FIG. 6. The wireless power transmitter 400 may apply the second detection power 601 and 602 periodically with a second period. When the wireless power transmitter 400 supplies the second detection power 601 and 602, the second detection power 601 and 602 may last for a second time duration. The wireless power transmitter 400 may apply the third detection power 611 to 615 periodically with a third period. When the wireless power transmitter 400 supplies the third detection power 611 to 615, the third detection power 611 to 615 may last for a third time duration. The third detection power 611 to 615 may have the same power value, or different power values as illustrated in FIG. 6.

After outputting the third detection power 611, the wireless power transmitter 400 may output the third detection power 612 having the same power amount. If the wireless power transmitter 400 outputs third detection power 612 having the same amount as described above, the third detection power 612 may have a power amount sufficient to detect the smallest wireless power receiver 450, for example, a wireless power receiver of category 1.

On the other hand, after outputting the third detection power 611, the wireless power transmitter 400 may output the third detection power 612 having a different power amount. If the wireless power transmitter 400 outputs different amounts of third detection power as described above, the respective power amounts of the third detection power may be sufficient to detect wireless power receivers of category 1 to category 5. For example, the third detection power 611 may have a power amount sufficient to detect a wireless power receiver 450 of category 5, the third detection power 612 may have a power amount sufficient to detect a wireless power receiver of category 3, and the third detection power 613 may have a power amount sufficient to detect a wireless power receiver 450 of category 1.

The second detection power 601 and 602 may drive the wireless power receiver 450. In addition, the second detection power 601 and 602 may have a power amount sufficient to drive the controller and/or the communication unit of the wireless power receiver 450.

The wireless power transmitter 400 may apply the second detection power 601 and 602 and the third detection power 611 to 615 respectively with the second and third periods to the power transmission unit. If the wireless power receiver 450 is placed on the wireless power transmitter 400, an impedance viewed from a point of view of the wireless power transmitter 400 may be changed. The wireless power transmitter 400 may detect an impedance change during an application of the second detection power 601 and 602 and the third detection power 611 to 615. For example, the wireless power transmitter 400 may detect an impedance change during an application of the third detection power 615. Therefore, the wireless power transmitter 400 may detect an object in step S507 in FIG. 5. If no object is detected in step S507, the wireless power transmitter 400 may be kept in the power save mode in which it applies different types of power periodically in step S505.

If the wireless power transmitter 400 detects an object due to an impedance change in step S507, the wireless power transmitter may enter the low power mode in step 509. In the low power mode, the wireless power transmitter 400 applies a driving power having a power amount sufficient to drive the controller and the communication unit of the wireless power receiver 450. For example, the wireless power transmitter 400 may apply driving power 620 to the power transmission unit in FIG. 6. The wireless power receiver 450 may receive the driving power 620 and drive the controller and/or the communication unit with the driving power 620. The wireless power receiver 450 may communicate with the wireless power transmitter 400 with the driving power 620 in a predetermined communication scheme. For example, the wireless power receiver 450 may transmit and receive data required for authentication and may join a wireless power network managed by the wireless power transmitter 400 based on the data. However, if a rogue object is placed instead of a wireless power receiver 450, data transmission and reception may not be performed. Therefore, the wireless power transmitter 400 may determine whether the object is a rogue object in step S511 in FIG. 5. For example, if the wireless power transmitter 400 fails to receive a response from the object for a predetermined time, the wireless power transmitter 400 may determine the object as a rogue object.

If the wireless power transmitter 400 determines the object as a rogue object in step S511, the wireless power transmitter 400 may enter the latch fault mode in step S513. On the contrary, if the wireless power transmitter 400 determines that the object is not a rogue object in step S511, the wireless power transmitter 400 may proceed with a joining operation in step S519. For example, the wireless power transmitter 400 may apply first power 631 to 634 periodically with a first period in FIG. 6. The wireless power transmitter 400 may detect an impedance change during an application of the first power. For example, if the rogue object is removed in step S515 in FIG. 5, the wireless power transmitter 400 may detect an impedance change and thus determine that the rogue object has been removed. On the contrary, if the rogue object is not removed in step S515, the wireless power transmitter 400 may not detect an impedance change and thus may determine that the rogue object has not been removed. If the rogue object has not been removed, the wireless power transmitter 400 may notify a user that the wireless power transmitter 400 is currently in an error state by performing at least one of illuminating a lamp or outputting a warning sound. Accordingly, the wireless power transmitter 400 may include an output unit for illuminating a lamp and/or outputting a warning sound.

If it is determined that the rogue object has not been removed in step S515, the wireless power transmitter 400 may maintain the latch fault mode in step S513. On the other hand, if the rogue object has been removed in step S515, the wireless power transmitter may reenter the power save mode in step S517. For example, the wireless power transmitter may apply second power 651 and 652 and third power 661 to 665 in FIG. 6.

As described above, if a rogue object is placed on the wireless power transmitter 400, instead of a wireless power receiver 450, the wireless power transmitter 400 may enter the latch fault mode. Further, the wireless power transmitter 400 may determine whether the rogue object has been removed, based on an impedance change that occurs according to power applied in the latch fault mode. That is, a condition of entry to the latch fault mode may be the presence of a rogue object in the embodiment illustrated in FIGS. 5 and 6. In addition to the presence of a rogue object, the wireless power transmitter 400 may have many other conditions for entry to the latch fault mode. For example, the wireless power transmitter 400 may be cross-connected to a wireless power receiver 450 placed on another wireless power transmitter. In this case, the wireless power transmitter 400 may also enter the latch fault mode.

When the wireless power transmitter 400 is cross-connected to a wireless power receiver 450, the wireless power transmitter 400 must return to an initial state and the wireless power receiver 450 should be removed. The wireless power transmitter 400 may set a cross connection of a wireless power receiver 450 placed on another wireless power transmitter, that is, joining of a wireless power receiver 450 placed on another wireless power transmitter in a wireless power network managed by the wireless power transmitter 450 as a condition for entry to the latch fault mode. An operation of a wireless power transmitter 400 upon an occurrence of an error such as a cross connection is described below with reference to FIG. 7.

Figure 7:
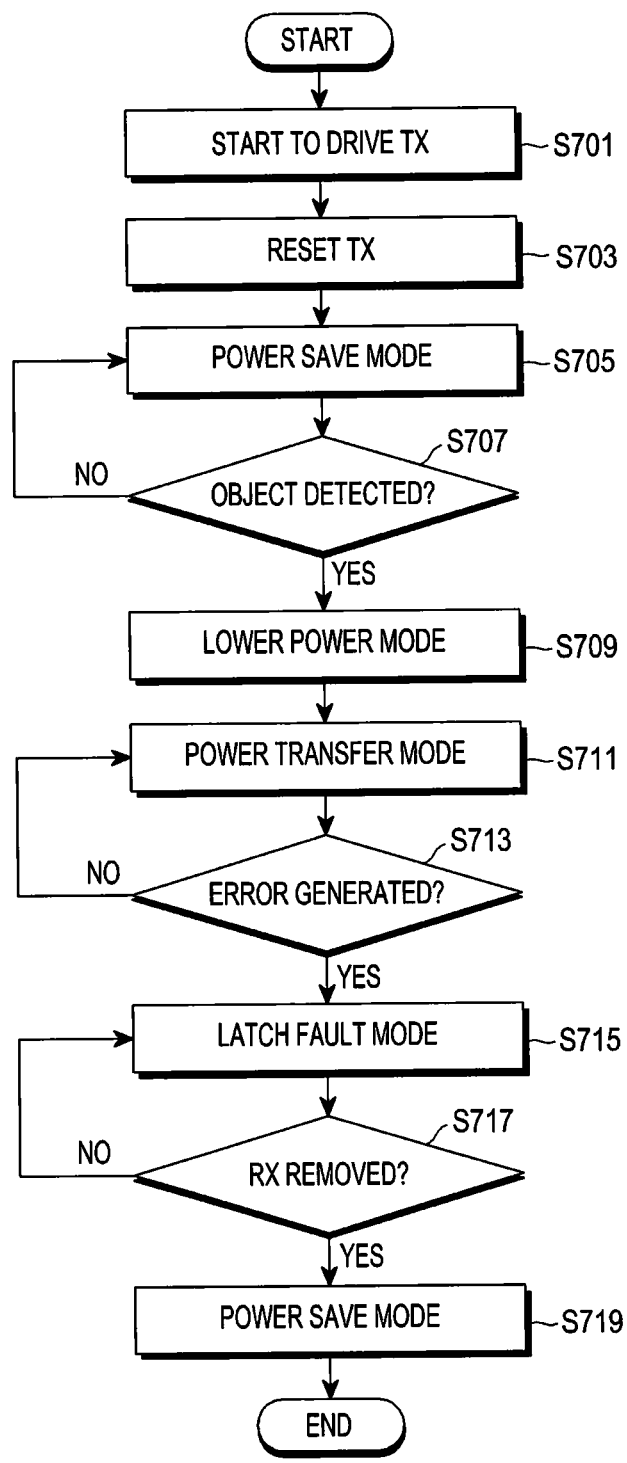
FIG. 7 is a flowchart of a method of controlling a wireless power transmitter according to an embodiment of the present invention.
Figure 8:
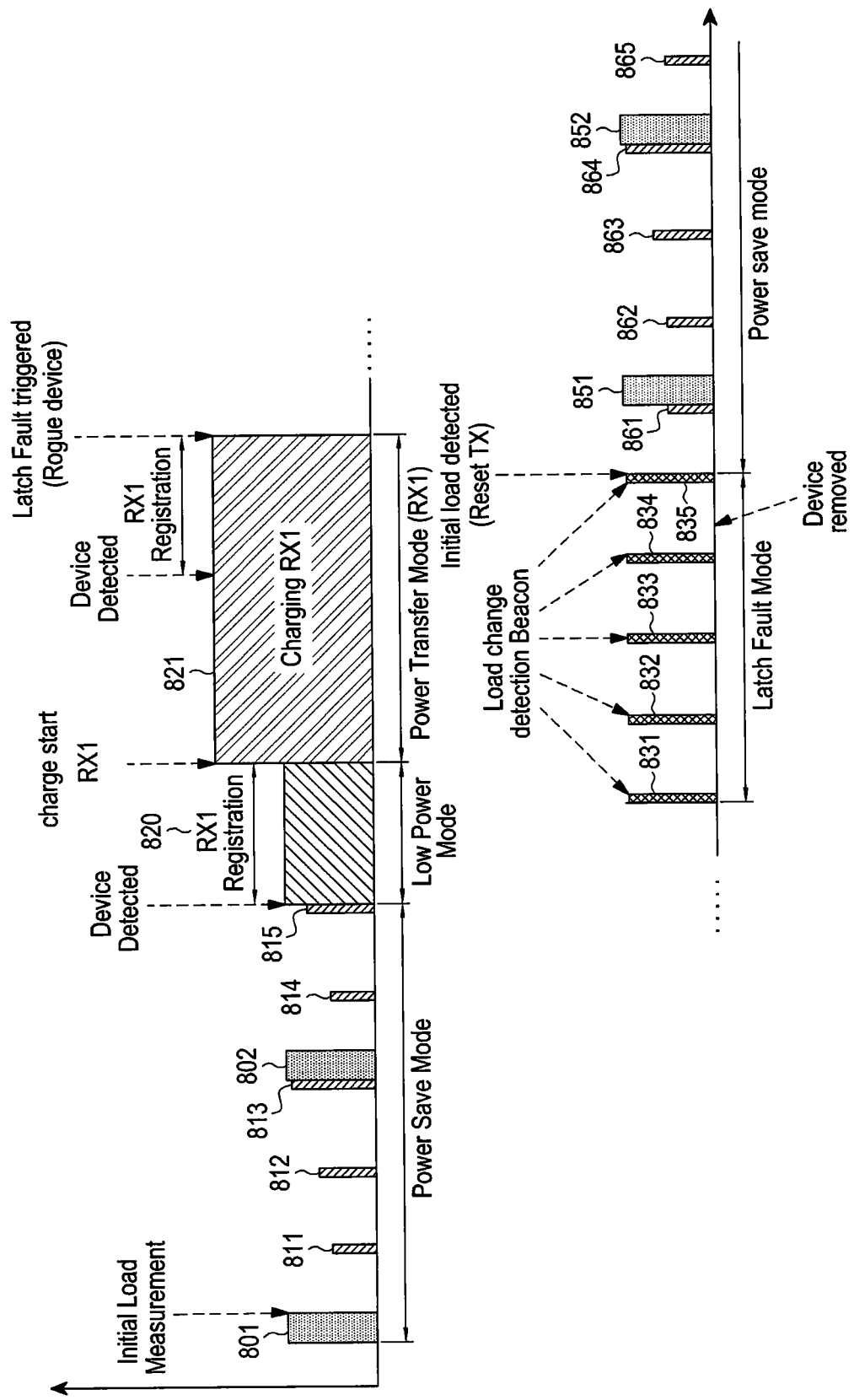
FIG. 8 is a graph illustrating amounts of power applied by a wireless power transmitter with respect to a time axis according to the flowchart of FIG. 7.

FIG. 7 is a flowchart of a method of controlling a wireless power transmitter according to an embodiment of the present invention. The control method of FIG. 7 will be described in detail with reference to FIG. 8. FIG. 8 is a graph illustrating amounts of power supplied by a wireless power transmitter 400 with respect to a time axis according to the flowchart of FIG. 7.

Referring to FIG. 7, the wireless power transmitter 400 may start to operate in step S701. Further, the wireless power transmitter 400 may reset an initial setting in step S703 and may enter the power save mode in step S705. The wireless power transmitter 400 may apply different types of power having different power amounts to the power transmission unit in the power save mode. For example, the wireless power transmitter may apply second detection power 801 and 802 and third detection power 811 to 815 to the power transmission unit in FIG. 8. The wireless power transmitter 400 may apply the second detection power 801 and 802 periodically with a second period. When the wireless power transmitter 400 applies the second detection power 801 and 802, the second detection power 801 and 802 may last for a second time duration. The wireless power transmitter may apply the third detection power 811 to 815 periodically with a third period. When the wireless power transmitter applies the third detection power 811 to 815, the third detection power 811 to 815 may last for a third time duration. The third detection power 811 to 815 may have the same power value, or different power values as illustrated in FIG. 8.

The second detection power 801 and 802 may drive the wireless power receiver 450. In addition, the second detection power 801 and 802 may have a power amount sufficient to drive the controller and/or the communication unit of the wireless power receiver 450.

The wireless power transmitter 400 may apply the second detection power 801 and 802 and the third detection power 811 to 815 respectively with the second and third periods to the wireless power receiver 450. If the wireless power receiver 450 is placed on the wireless power transmitter 400, an impedance viewed from a point of view of the wireless power transmitter 400 may be changed. The wireless power transmitter 400 may detect an impedance change during an application of the second detection power 801 and 802 and the third detection power 811 to 815. For example, the wireless power transmitter 400 may detect an impedance change during application of the third detection power 815. Therefore, the wireless power transmitter 400 may detect an object in step S707 in FIG. 7. If no object is detected in step S707, the wireless power transmitter 400 may be kept in the power save mode in which it applies different types of power periodically in step S705.

If the wireless power transmitter detects an object due to an impedance change in step S707, the wireless power transmitter 400 may enter the low power mode in step S709. In the low power mode, the wireless power transmitter 400 applies a driving power having a power amount sufficient to drive the controller and/or the communication unit of the wireless power receiver 450. For example, the wireless power transmitter 400 may apply driving power 820 to the power transmission unit in FIG. 8. The wireless power receiver 450 may receive the driving power 820 and drive the controller and/or the communication unit with the driving power 820. The wireless power receiver 450 may communicate with the wireless power transmitter with the driving power 820 in a predetermined communication scheme. For example, the wireless power receiver 450 may transmit and receive data required for authentication and joining a wireless power network managed by the wireless power transmitter 400 based on the data.

Subsequently, the wireless power transmitter 400 may enter the power transfer mode in which it transmits charging power in step S711 in FIG. 7. For example, the wireless power transmitter may apply charging power 821 and the charging power 821 may be transmitted to the wireless power receiver, as illustrated in FIG. 8.

In the power transfer mode, the wireless power transmitter 400 may determine whether an error has occurred. The error may be the presence of a rogue object on the wireless power transmitter 400, a cross connection, an overvoltage condition, an overcurrent condition, or an overtemperature condition. The wireless power transmitter 400 may include a sensing unit for measuring an overvoltage condition, an overcurrent condition, or an overtemperature condition. For example, the wireless power transmitter 400 may measure a voltage or current at a reference point and may determine that a measured voltage or current exceeding a threshold satisfies an overvoltage or overcurrent condition. Alternatively, the wireless power transmitter 400 may include a temperature sensor and the temperature sensor may measure a temperature at a reference point of the wireless power transmitter 400. If the temperature at the reference point exceeds a threshold, the wireless power transmitter may determine that an overtemperature condition is satisfied.

If the wireless power transmitter determines an overvoltage, overcurrent, or overtemperature state according to a measured voltage, current, or temperature value, the wireless power transmitter prevents overvoltage, overcurrent, or overtemperature by decreasing wireless charging power by a predetermined value. If the voltage value of the decreased wireless charging power is below a set minimum value (for example, the minimum voltage value $V_{RECT\_MIN\_DYN}$ at the output of the rectifier of the wireless power receiver 450), wireless charging is discontinued and thus a voltage set value may be re-adjusted according to an embodiment of the present invention.

While presence of a rogue object on the wireless power transmitter is shown as an error in FIG. 8, the error is not limited to the presence of a rogue object. Thus, it will be readily understood by those skilled in the art that the wireless power transmitter 400 may operate in a similar manner regarding the presence of a rogue object, a cross connection, an overvoltage condition, an overcurrent condition, and an overtemperature condition.

If no error occurs in step S713 in FIG. 7, the wireless power transmitter 400 may maintain the power transfer mode in step S711. On the other hand, if an error occurs in step S713, the wireless power transmitter 400 may enter the latch fault mode in step S715. For example, the wireless power transmitter 400 may apply first power 831 to 835 as illustrated in FIG. 8. Further, the wireless power transmitter 400 may output an error notification including at least one of lamp illumination or a warning sound during the latch fault mode. If it is determined that the rogue object or the wireless power receiver has not been removed in step S717 in FIG. 7, the wireless power transmitter may maintain the latch fault mode in step S715. On the contrary, if it is determined that the rogue object or the wireless power receiver has been removed in step S717, the wireless power transmitter may reenter the power save mode in step S719. For example, the wireless power transmitter may apply second power 851 and 852 and third power 861 to 865 in FIG. 8.

An operation of a wireless power transmitter 400 upon occurrence of an error during transmission of charging power is described above. A description is given below of an operation of the wireless power transmitter 400, when a plurality of wireless power receivers 450 placed on the wireless power transmitter 400 receive charging power from the wireless power transmitter 400.

Figure 9:
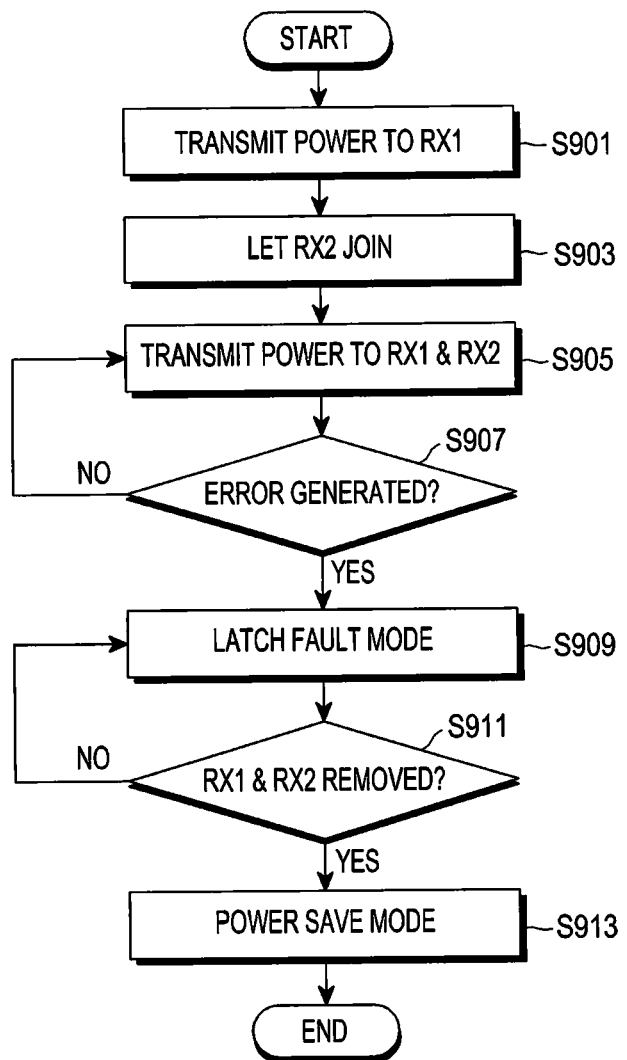
FIG. 9 is a flowchart of a method of controlling a wireless power transmitter according to an embodiment of the present invention.
Figure 10:
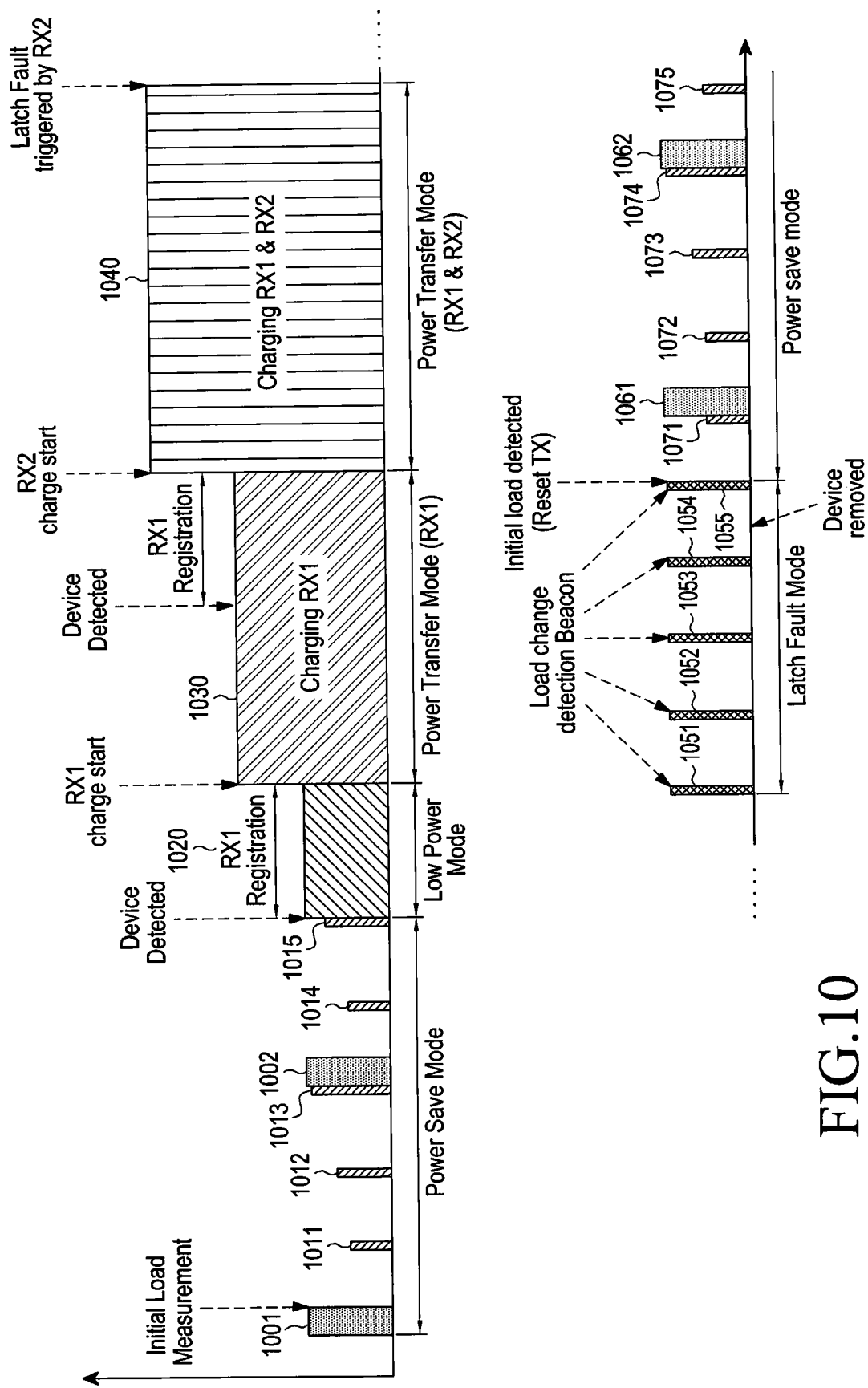
FIG. 10 is a graph illustrating amounts of power supplied by a wireless power transmitter with respect to a time axis according to the flowchart of FIG. 9.

FIG. 9 is a flowchart of a method of controlling a wireless power transmitter 400 according to an embodiment of the present invention. The control method of FIG. 9 is described below in detail with reference to FIG. 10. FIG. 10 is a graph illustrating amounts of power applied by the wireless power transmitter 450 with respect to a time axis according to the flowchart of FIG. 9.

Referring to FIG. 9, the wireless power transmitter 400 may transmit charging power to a first wireless power receiver 450 in step S901. Further, the wireless power transmitter 400 may additionally allow a second wireless power receiver to join the wireless power network in step S903. The wireless power transmitter may also transmit charging power even to the second wireless power receiver in step S905. In addition, the wireless power transmitter 400 may apply the sum of the charging power required for the first wireless power receiver and the charging power required for the second wireless power receiver to power reception units of the first and second wireless power receivers.

Steps S901 to S905 are illustrated in FIG. 10. For example, the wireless power transmitter 400 may maintain the power save mode in which the wireless power transmitter 400 applies second detection power 1001 and 1002 and third detection power 1011 to 1015. Subsequently, the wireless power transmitter 400 may detect the first wireless power receiver and enter the low power mode in which the wireless power transmitter 400 maintains detection power 1020. Then, the wireless power transmitter 400 may enter the power transfer mode in which the wireless power transmitter 400 applies first charging power 1030. The wireless power transmitter 400 may detect the second wireless power receiver and may allow the second wireless power receiver to join the wireless power network. In addition, the wireless power transmitter 400 may apply second charging power 1040 being the sum of the charging power required for the first wireless power receiver and the charging power required for the second wireless power receiver.

Referring back to FIG. 9, while transmitting charging power to both the first and second wireless power receivers in step S905, the wireless power transmitter may detect an error in step S907. As described above, the error may be the presence of a rogue object, a cross connection, an overvoltage condition, an overcurrent condition, or an overtemperature condition. If no error occurs in step S907-N, the wireless power transmitter may continue to apply second charging power 1040.

On the other hand, if an error occurs in step S907, the wireless power transmitter 400 may enter the latch fault mode in step S909. For example, the wireless power transmitter 400 may apply first power 1051 to 1055 with a first period as illustrated in FIG. 10. The wireless power transmitter 400 may determine whether both the first and second wireless power receivers have been removed in step S911 in FIG. 9. For example, the wireless power transmitter 400 may detect an impedance change while applying the first power 1051 to 1055. The wireless power transmitter 400 may determine whether both the first and second wireless power receivers have been removed, by checking whether the impedance has returned to an initial value.

If it is determined that both the first and second wireless power receivers have been removed in step S911, the wireless power transmitter 400 may enter the power save mode in step S913. For example, the wireless power transmitter 400 may apply second detection power 1061 and 1062 and third detection power 1071 to 1075 respectively with second and third periods, as illustrated in FIG. 10.

As described above, even though the wireless power transmitter 400 applies charging power to a plurality of wireless power receivers, upon occurrence of an error, the wireless power transmitter 400 may readily determine whether a wireless power receiver or a rogue object has been removed.

Figure 11:
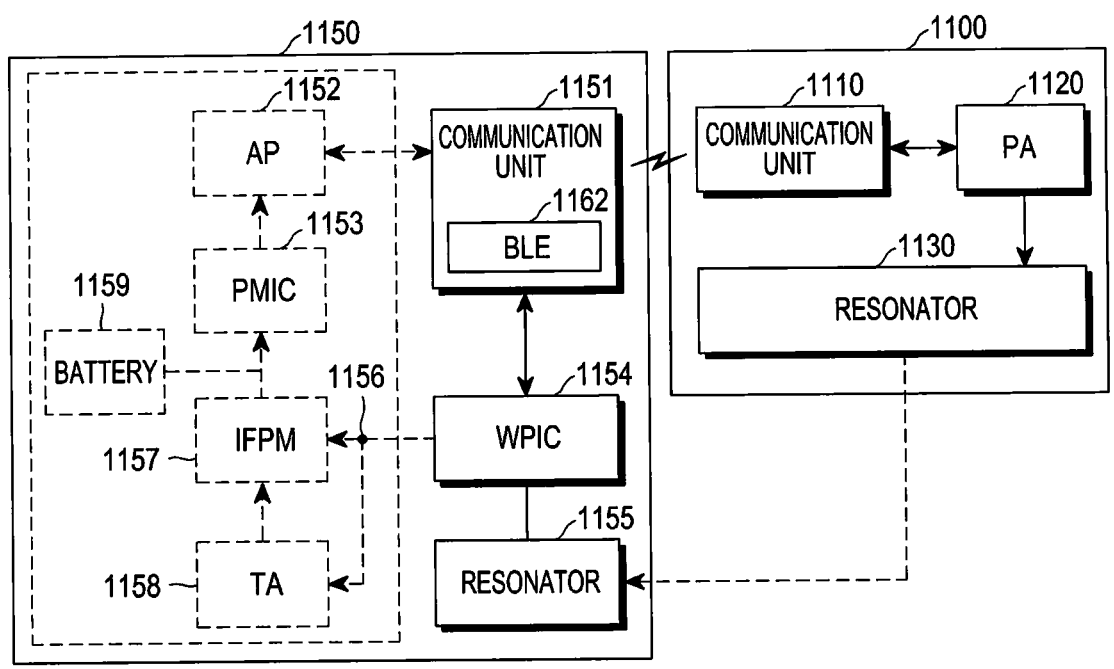
FIG. 11 is a block diagram of a wireless power transmitter and a wireless power receiver in a Stand Alone (SA) mode according to an embodiment of the present invention.

FIG. 11 is a block diagram of a wireless power transmitter and a wireless power receiver in an SA mode according to an embodiment of the present invention.

Referring to FIG. 11, a wireless power transmitter 1100 may include a communication unit 1110, a PA 1120, and a resonator 1130. A wireless power receiver 1150 may include a communication unit (or a Wireless Power Transfer (WPT) Communication IC) 1151, an Application Processor (AP) 1152, a Power Management Integrated Circuit (PMIC) 1153, a Wireless Power Integrated Circuit (WPIC) 1154, a resonator 1155, an Interface Power Management IC (IFPM) 1157, a TA 1158, and a battery 1159.

The communication unit 1110 of the wireless power transmitter 1100 may be implemented as a WiFi/BT combination IC and may communicate with the communication unit 1151 of the wireless power receiver 1150 in a predetermined communication scheme, for example, in BLE. For example, the communication unit 1151 of the wireless power receiver 1150 may transmit a PRU dynamic signal having the afore-described data structure illustrated in Table 1 above to the communication unit 1110 of the wireless power transmitter 1100. As described above, the PRU dynamic signal may include at least one of voltage information, current information, temperature information and alert information of the wireless power receiver 1150.

An output power value from the PA 1120 may be adjusted based on the received PRU dynamic signal. For example, if an overvoltage, overcurrent, or overtemperature condition is applied to the wireless power receiver 1150, a power value output from the PA 1120 may be decreased. If the voltage or current of the wireless power receiver 1150 is below a predetermined value, the power value output from the PA 1120 may be increased.

Charging power from the resonator 1130 of the wireless power transmitter 1100 may be transmitted wirelessly to the resonator 1155 of the wireless power receiver 1150.

The WPIC 1154 may rectify the charging power received from the resonator 1155 and perform DC/DC conversion on the rectified charging power. The WPIC 1154 may drive the communication unit 1151 or charge the battery 1159 with the converted power.

A wired charging terminal may be inserted into the TA 1158. A wired charging terminal such as a 30-pin connector or a Universal Serial Bus (USB) connector may be inserted into the TA 1158. The TA 1158 may receive power from an external power source and charge the battery 1159 with the received power.

The IFPM 1157 may process the power received from the wired charging terminal and output the processed power to the battery 1159 and the PMIC 1153.

The PMIC 1153 may manage power received wirelessly or wiredly and power applied to each component of the wireless power receiver 1150. The AP 1152 may receive power information from the PMIC 1153 and control the communication unit 1151 to transmit a PRU dynamic signal for reporting the power information.

A node 1156 connected to the WPIC 1154 may also be connected to the TA 1158. If a wired charging connector is inserted into the TA 1158, a predetermined voltage, for example, 5V may be applied to the node 1156. The WPIC 1154 may determine whether the wired charging adaptor has been inserted by monitoring a voltage applied to the node 1156.

The AP 1152 has a stack of a predetermined communication scheme, for example, a WiFi/BT/BLE stack. Accordingly, the communication unit 1151 for communication for wireless charging may load the stack from the AP 1152 and then communicate with the communication unit 1110 of the wireless power transmitter 1100 based on the stack by WiFi/BT/BLE.

However, it may occur that data for wireless power transmission cannot be retrieved from the AP 1152 due to an OFF state of the AP 1152 or power is insufficient to maintain an ON state of the AP 1152 during retrieving the data from a memory of the AP 1152 and using the retrieved data.

If the residual power amount of the battery 1159 is below a minimum power limit as described above, the AP 1152 may be turned off and the battery 1159 may be wirelessly charged using some components for wireless charging in the wireless power receiver 1150, for example, the communication unit 1151, the WPIC 1154, and the resonator 1155. A state in which power sufficient to turn on the AP 1152 cannot be supplied may be referred to as a dead battery state.

Because the AP 1152 is not operated in the dead battery state, the communication unit 1151 may not receive the stack of the predetermined communication scheme, for example, the WiFi/BT/BLE stack from the AP 1152. In anticipation of this case, a part of the stack of the predetermined communication scheme, for example a BLE stack, may be fetched from the AP 1152 and stored in a memory 1162 of the communication unit 1151. Accordingly, the communication unit 1151 may communicate with the wireless power transmitter 1100 using the stack of the communication scheme stored in the memory 1162, that is, a wireless charging protocol, for wireless charging. The communication unit 1151 may have an internal memory. The BLE stack may be stored in a Read Only Memory (ROM) in the SA mode.

As described above, a mode in which the communication unit 1151 communicates using the stack of the communication scheme stored in the memory 1162 may be referred to as the SA mode. Accordingly, the communication unit 1151 may manage the charging procedure based on the BLE stack.

According to an embodiment of the present invention, if the battery 1159 of the wireless power receiver 1150 is in the dead battery state, or if the AP 1152 cannot receive the BLE stack from the communication unit 1151 as the AP is not operated in the state where the wireless power receiver 1150 is powered off, the wireless power receiver 1150 may not transmit an advertisement signal through the communication unit 1151 within a predetermined time, after receiving a beacon signal from the wireless power transmitter 1100.

For example, according to the A4WP standard, the wireless power transmitter 1100 may transmit a long-beacon signal, and upon receiving the long-beacon signal, the wireless power receiver 1150 may transmit an advertisement signal to the wireless power transmitter 1100 within a predetermined time, thereby proceeding with a registration procedure for wireless charging.

However, as described above, if a boot procedure for operating the AP 1152 is required while the battery power of the wireless power receiver 1150 is low or depleted, or the wireless power receiver 1150 is powered off, the wireless power receiver 1150 may not transmit an advertisement signal to the wireless power transmitter 1100 through the communication unit 1151 within a predetermined time. If the wireless power receiver 1150 cannot transmit an advertisement signal within a predetermined time in this way, the normal registration procedure may not be performed, making it impossible to wirelessly charge the wireless power receiver 1150.

Reference will now be made to FIGS. 12 to 17 for a description of various embodiments of extending a transmission period of a beacon signal to make it possible to receive an advertisement signal within a predetermined time despite the delay in the time that is required until the advertisement signal is transmitted through the communication unit 1150 after the AP 1152 of the wireless power receiver 1150 is executed.

With reference to FIGS. 1 to 11, a wireless charging system according to the present invention is described above. A method of transmitting a signal by a wireless power transmitter in a wireless charging system, and a wireless power transmitter and a wireless power receiver according to an embodiment of the present invention, is described below in detail with reference to FIGS. 12 to 17.

Figure 12:
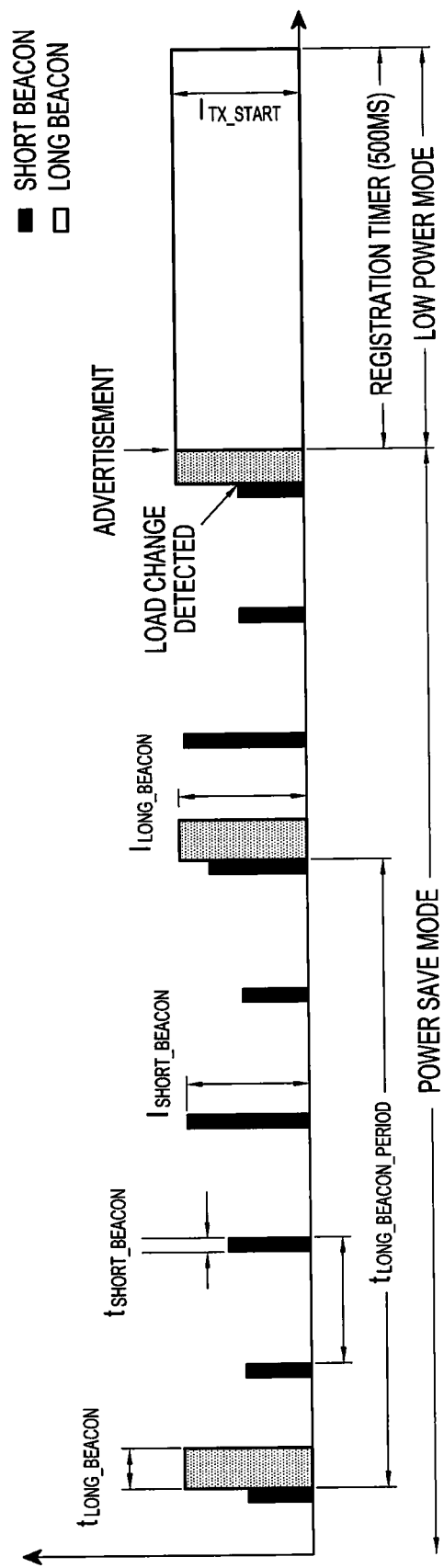
FIG. 12 is a graph illustrating transmission of a beacon signal according to an embodiment of the present invention.

FIG. 12 is a graph illustrating transmission of a beacon signal according to an embodiment of the present invention.

Referring to FIG. 12, a wireless power transmitter (PTU) may periodically apply a current $I_{TX\_LONG\_BEACON}$ for transmission of a long-beacon signal to its PTU resonator in the power save mode or the power save state. The wireless power transmitter may apply the current $I_{TX\_LONG\_BEACON}$ for transmission of a long-beacon signal within 10 ms in which a short-beacon signal is terminated.

For example, according to a standard document, a period $t_{LONG\_BEACON}$ in which the long-beacon signal is transmitted may be 105 ms±5 ms, if the wireless power transmitter does not leave the power save mode. The period $t_{LONG\_BEACON}$ may be shorter. For example, a period $t_{LONG\_BEACON\_PERIOD}$ in which the long-beacon signal is transmitted may be 850 ms or more, but does not exceed 3 seconds.

Upon receiving an advertisement signal related to a wireless power transmission service while the long-beacon signal is transmitted, the wireless power transmitter may be switched to the low power mode or the low power state and transmit a connection request within 0 to 50 ms. The advertisement signal should meet the following conditions:

the Received Signal Strength Indicator (RSSI) of an advertisement signal is greater than ADV_PWR_MIN that is measured at a receiving antenna; and the wireless power transmitter monitors a change in impedance at around the time of the advertisement time.

If all of these conditions are not satisfied, the wireless power transmitter may ignore the advertisement signals from the wireless power receiver. If one of the conditions is satisfied and if, for example, an eleventh advertisement signal is received, or more than 1700 ms has elapsed, the wireless power transmitter may transmit a connection request.

After the connection request, the wireless power transmitter may maintain the power level for 500 ms, for registration of the wireless power receiver.

If the battery power of the wireless power receiver is depleted or the wireless power receiver is in the dead battery state, the wireless power receiver may not transmit an advertisement signal within 110 ms. If the wireless power supplied by the wireless power transmitter cannot wake the communication unit (e.g., a BLE chip of the communication unit) within 110 ms, it may be impossible to wirelessly charge the wireless power receiver.

Figure 13:
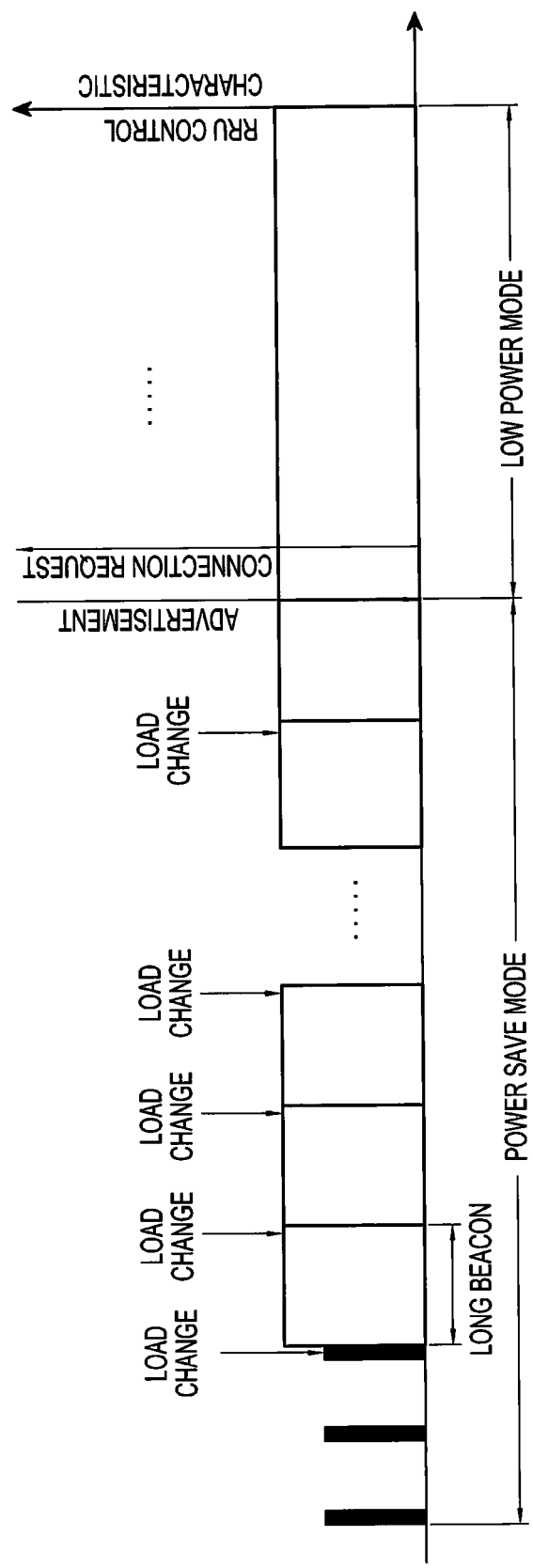
FIG. 13 is a graph illustrating transmission of a beacon signal according to an embodiment of the present invention.

FIG. 13 is a graph illustrating transmission of a beacon signal according to an embodiment of the present invention.

Referring to FIG. 13, if the wireless power receiver is not awakened by the wireless power (e.g., a short-beacon signal or a long-beacon signal) transmitted from the wireless power transmitter, the wireless power receiver must receive the power supplied from its own battery.

In a case where the battery of the wireless power receiver is depleted or the wireless power receiver is in the dead battery state, if the period in which the wireless power is supplied from the wireless power transmitter is not long enough to charge the battery and wake up the controller (e.g., an MCU chip), the wireless power receiver may not transmit the advertisement signal for entering the low power mode.

For example, according to a wireless charging standard document, a transmission period of a long-beacon signal is only 105 ms±5 ms, which may be too short to wake up the controller (e.g., the AP 1152 in FIG. 11) of the wireless power receiver and send an advertisement signal to the wireless power transmitter.

For this reason, the wireless power receiver must extend the long-beacon transmission period to a sufficient period to charge the battery and wake up the controller.

Therefore, according to an embodiment of the present invention, the wireless power transmitter may check a load change more than once before the long-beacon transmission period (e.g., about 100 ms) is terminated. In addition, according to an embodiment of the present invention, the wireless power receiver may generate a load change that can be detected by the wireless power transmitter before the long-beacon transmission period is terminated.

In other words, before the long-beacon transmission period is terminated, the wireless power receiver may generate a load change and the wireless power transmitter may detect the load change and extend the long-beacon transmission period by an additional long-beacon transmission period. According to an embodiment of the present invention, as the wireless power receiver generates a load change within the long-beacon transmission period, the wireless power transmitter may continue to extend the long-beacon transmission period.

Since the wireless power transmitter can detect a load change before termination of the long-beacon transmission period and extend the long-beacon transmission period by another long-beacon signal transmission period, the wireless power receiver may maintain the long-beacon signal transmission period by periodically generating a load change. The periodic load change may be generated by a dummy load or an equivalent circuit.

Accordingly, the wireless power receiver may extend the transmission period of the long-beacon signal until the battery of the wireless power receiver is charged or the wireless power receiver supplies sufficient power to wake up the controller.

In addition, according to an embodiment of the present invention, since the wireless power transmitter must save power, the wireless power transmitter may limit the number of extensions for the long-beacon signal of the wireless power receiver, or the wireless power transmitter may extend the transmission time of the long-beacon signal only up to a predetermined time (e.g., 7 seconds). The predetermined time may be set to a time that is sufficient to wake up the controller of the wireless power receiver and receive an advertisement signal from the wireless power receiver.

Figure 14:
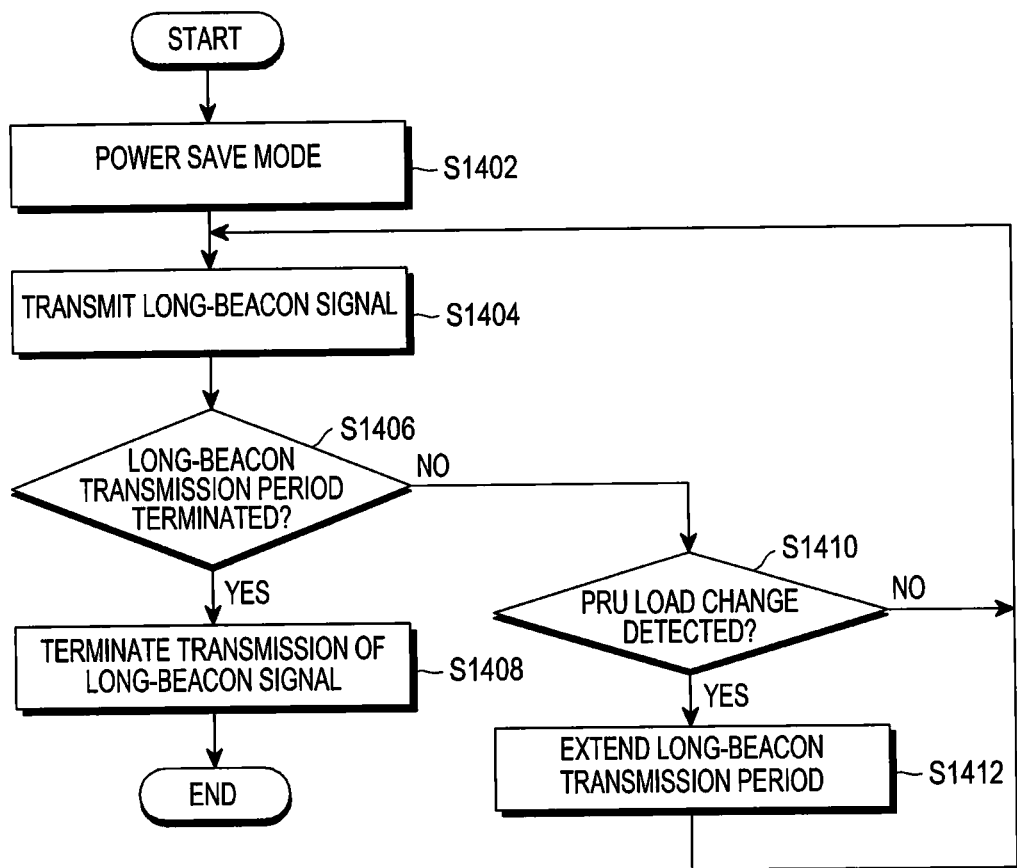
FIG. 14 is a flowchart illustrating a beacon signal transmission procedure according to an embodiment of the present invention.

FIG. 14 is a flowchart illustrating a beacon signal transmission procedure according to an embodiment of the present invention.

Referring to FIG. 14, in the power save mode in step S1402, the wireless power transmitter may transmit a short-beacon signal or a long-beacon signal in every predetermined period during a predetermined period of time in step S1404. If the predetermined long-beacon transmission period is terminated in step S1406, the transmission of the long-beacon signal may be terminated in step S1408 and the long-beacon signal may be transmitted again upon arrival of the next transmission period.

According to an embodiment of the present invention, if a load change of the wireless power receiver is detected in step S1410 before the transmission of the long-beacon signal is terminated in step S1406 (or during the transmission of the long-beacon signal), the predetermined transmission period of the long-beacon signal may be extended in step S1412.

Figure 15:
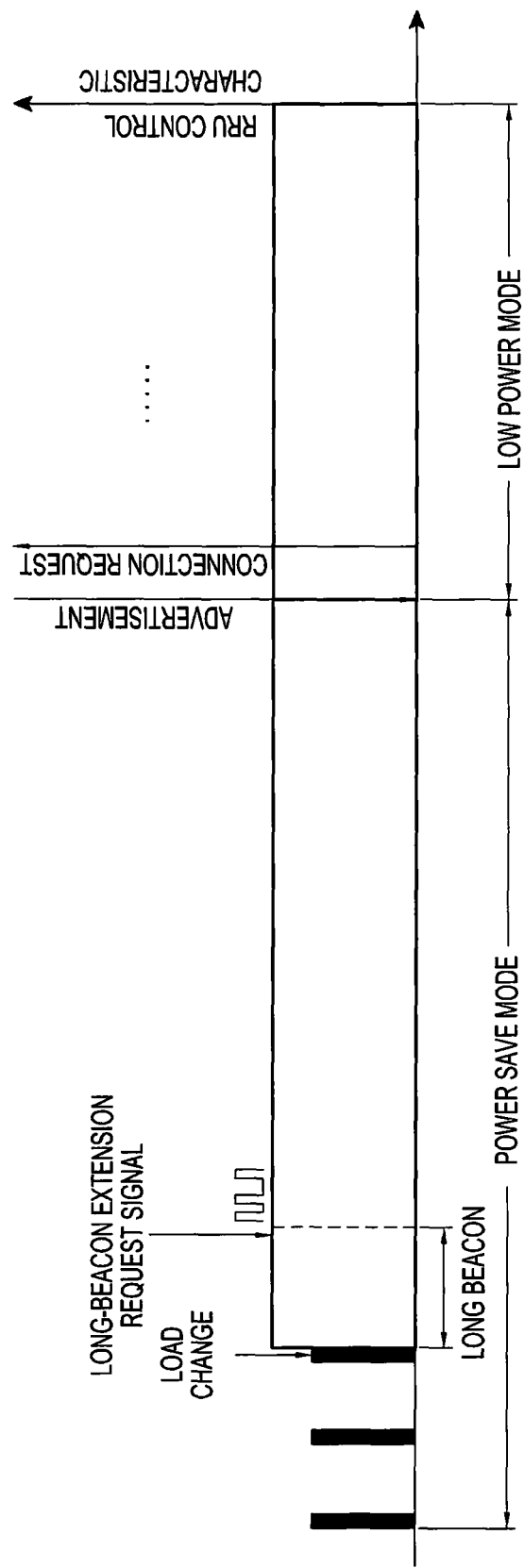
FIG. 15 is a graph illustrating transmission of a beacon signal according to an embodiment of the present invention.

FIG. 15 is a graph illustrating transmission of a beacon signal according to an embodiment of the present invention.

Referring to FIG. 15, in an embodiment of the present invention, a wireless power receiver may make a request to extend a long-beacon signal transmission period using an in-band signal.

For example, as illustrated in FIG. 15, before the long-beacon transmission period is terminated, if the wireless power transmitter demodulates an in-band signal and detects a predetermined code or signal as a result of the demodulation, the wireless power transmitter may extend the transmission period of the long-beacon signal by a predetermined period.

The transmission period of the long-beacon signal may be extended by taking into account the time that is sufficient to supply power to a controller of a wireless power receiver and transmit an advertisement signal to the wireless power transmitter.

According to an embodiment of the present invention, a long-beacon extension request signal that is transmitted in the in-band signal may be configured as a predetermined code or pulse signal. Accordingly, the wireless power transmitter may check the predetermined code or pulse by analyzing or demodulating the in-band signal, to thereby extend the long-beacon signal transmission period by a predetermined period.

According to an embodiment of the present invention, if the wireless power transmitter desires to transmit the long-beacon extension request signal using an in-band signal, the wireless power receiver may include a dummy load or a load modulation circuit. Upon receiving a short-beacon signal or a long-beacon signal from the wireless power transmitter, the wireless power receiver may transmit information using an in-band signal by switching a circuit connected to the dummy load or changing a load through the load modulation circuit.

The wireless power transmitter may further include a circuit capable of demodulating the load change from the in-band signal, and may detect a long-beacon extension request signal included in the in-band signal by demodulating and/or decoding the in-band signal.

Figure 16:
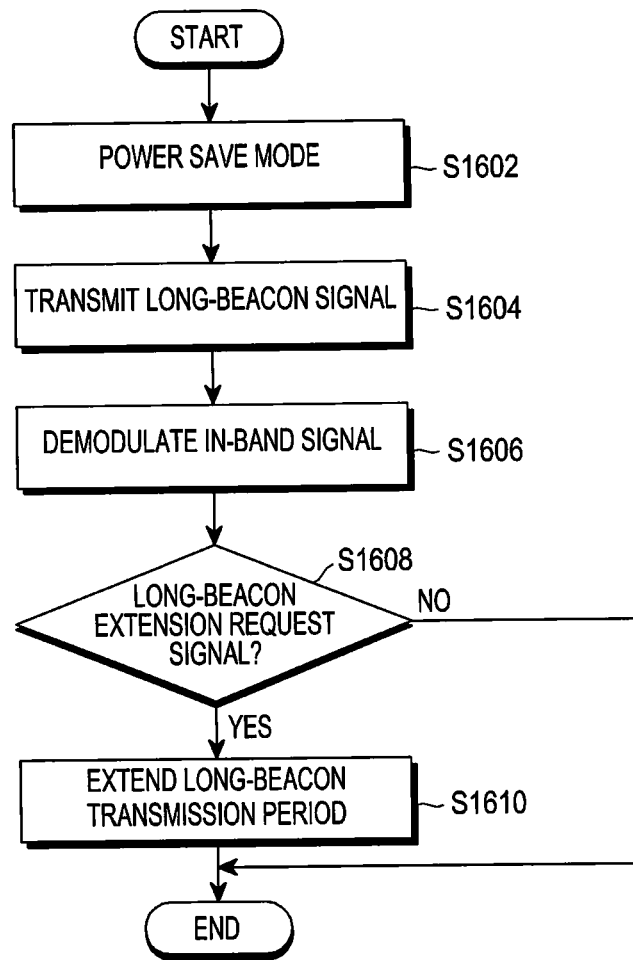
FIG. 16 is a flowchart illustrating a beacon signal transmission procedure according to an embodiment of the present invention.

FIG. 16 is a flowchart of a beacon signal transmission procedure according to an embodiment of the present invention.

Referring to FIG. 16, in the power save mode in step S1602, the wireless power transmitter may transmit a short-beacon signal or a long-beacon signal in every predetermined period during a predetermined period of time in step S1604. If the predetermined long-beacon transmission period is terminated, the transmission of the long-beacon signal may be terminated, and the long-beacon signal may be transmitted again upon arrival of the next transmission period.

According to various embodiments of the present invention, the wireless power transmitter may demodulate an in-band signal in step S1606, before the transmission of the long-beacon signal is terminated (or during the transmission of the long-beacon signal). If a code or signal corresponding to a predetermined long-beacon extension request signal is included in the in-band signal as a result of the demodulation in step S1608, the wireless power transmitter may extend the predetermined transmission period of the long-beacon signal by a predetermined period in step S1610.

Figure 17:
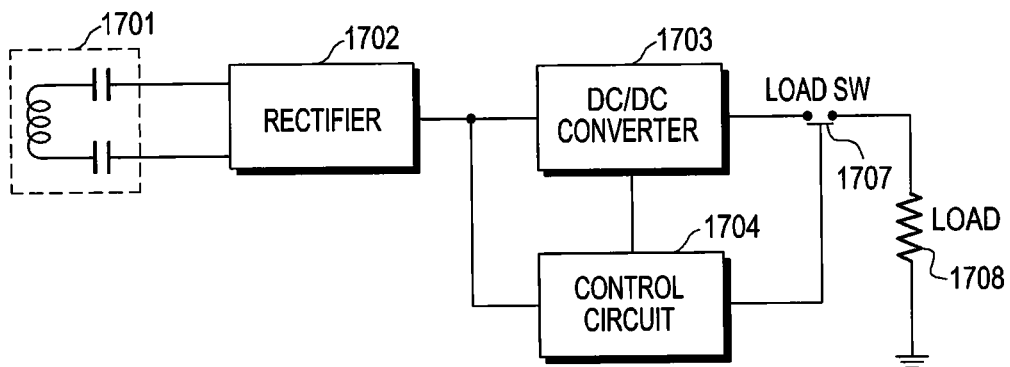
FIG. 17 is a block diagram of a wireless power receiver according to an embodiment of the present invention.

FIG. 17 is a block diagram of a wireless power receiver according to an embodiment of the present invention.

Referring to FIG. 17, the wireless power receiver may include a power reception unit 1701, a rectifier 1702, a DC/DC converter 1703, a control circuit 1704, a load switch 1707, and a load 1708.

An AC current received at the power reception unit 1701 may be converted into a DC current in the rectifier 1702. According to an embodiment of the present invention, the control circuit 1704 may be driven by the converted DC current, and may generate a control signal capable of controlling the load switch 1707 by a predetermined circuit.

For example, if the wireless power transmitter transmits a short-beacon signal or a long-beacon signal as described above, the control circuit 1704 may be driven by a signal that is received through the power reception unit 1701. Therefore, for example, the control circuit 1704 may be driven by the received short-beacon signal or long-beacon signal, and may control the load switch 1707 before the transmission of the long-beacon signal is terminated, to thereby generate a load change. The control circuit 1704 may be configured as a separate circuit independent of the controller of the wireless power receiver, and may be driven by the received current even before the controller (e.g., the AP) of the wireless power receiver is driven.

If the wireless power receiver generates a load change before the termination of the transmission of the long-beacon signal in this way, the wireless power transmitter may detect the load change and extend the transmission period of the long-beacon signal according to an embodiment of the present invention.

According to an embodiment of the present invention, the control circuit 1704 may be connected between the power reception unit 1701 and the rectifier 1702, and receive an AC current. Although the control circuit 1704 is illustrated to control ON/OFF of the load switch 1707 in FIG. 17, the control circuit 1704 may be configured to switch a connection of a dummy load provided in addition to the load 1708.

The above-described load change generation method and circuit illustrated in FIG. 17 may be utilized in various ways for device detection, long-beacon extension, cross connection prevention and detection, rogue device detection, in-band signaling and the like.

As is apparent from the foregoing description, according to an embodiment of the present invention, even in the case where the battery power of the wireless power receiver is low or depleted or where the boot procedure is required to operate the processor of the wireless power receiver, the wireless power transmitter may receive an advertisement signal within a predetermined time by detecting a load change.

In addition, according to an embodiment of the present invention, even in the case where the battery power of the wireless power receiver is low or depleted or where the boot procedure is required to operate the processor of the wireless power receiver, the wireless power transmitter may receive an advertisement signal within a predetermined time by receiving a predetermined signal from the wireless power receiver.

While the present invention has been shown and described with reference to certain embodiments thereof, it will be understood by those skilled in the art that various changes in form and details may be made therein without departing from the scope and spirit of the present invention as defined by the appended claims and their equivalents.

What is claimed is:

1. A control method of a wireless power receiver, the control method comprising:
   receiving, through a power receiving resonator, a first beacon from a wireless power transmitter, wherein the first beacon is output for a first duration in every first period by the wireless power transmitter;
   receiving, through the power receiving resonator, a second beacon from the wireless power transmitter, wherein the second beacon is output for a second duration in every second period by the wireless power transmitter, and the second beacon is received within a predetermined time of the first beacon ending;
   generating load changes while receiving the second beacon for the second duration to indicate that an extension of the second beacon is required;
   based on the generated load changes, continually receiving, from the wireless power transmitter, the second beacon for a third duration, wherein the third duration is predefined before the second beacon is output by the wireless power transmitter; and
   transmitting, through a communication circuit, an advertisement signal to the wireless power transmitter for a registration of the wireless power receiver while receiving the second beacon extended by the third duration.

2. The control method of claim 1, wherein the third duration is less than or equal to 7 seconds.

3. The control method of claim 1, wherein the third duration is greater than the second duration.

4. The control method of claim 1, wherein the load changes are generated by a dummy load.

5. The control method of claim 1, wherein the load changes are generated by an equivalent circuit.

6. The control method of claim 1, wherein the generating the load changes comprises generating load changes a predetermined number of times or more while receiving the second beacon for the second duration.

7. The control method of claim 1, further comprising:
encoding a predetermined value corresponding to an extension request signal for transmission of the second beacon;
generating an in-band signal based on the encoded predetermined value; and
transmitting the generated in-band signal to the wireless power transmitter.

8. The control method of claim 1, wherein the second duration is 105 milliseconds plus or minus 5 milliseconds.

9. The control method of claim 1, wherein the predetermined time is 10 milliseconds.

10. A wireless power receiver, comprising:
a communication circuit;
a power receiving resonator configured to receive a first beacon and a second beacon from a wireless power transmitter, wherein the first beacon is output for a first duration in every first period by the wireless power transmitter and the second beacon is output for a second duration in every second period by the wireless power transmitter, and wherein the second beacon is received within a predetermined time of the first beacon ending;
a load generating circuit configured to generate load changes while receiving the second beacon for the second duration to indicate that an extension of the second beacon is required; and
a controller configured to:
based on the generated load changes, control the power receiving resonator to continually receive, from the wireless power transmitter, the second beacon for a third duration, wherein the third duration is predefined before the second beacon is output by the wireless power transmitter; and
control the communication circuit to transmit an advertisement signal to the wireless power transmitter for a registration of the wireless power receiver while receiving the second beacon extended by the third duration.

11. The wireless power receiver of claim 10, wherein the third duration is less than or equal to 7 seconds.

12. The wireless power receiver of claim 10, wherein the third duration is greater than the second duration.

13. The wireless power receiver of claim 10, wherein the load generating circuit comprises a dummy load.

14. The wireless power receiver of claim 10, wherein the load generating circuit comprises an equivalent circuit.

15. The wireless power receiver of claim 10, wherein the load generating circuit is further configured to generate the load changes a predetermined number of times or more while receiving the second beacon for the second duration.

16. The wireless power receiver of claim 10, wherein the controller is further configured to:
encode a predetermined value corresponding to an extension request signal for transmission of the second beacon;
control to generate an in-band signal based on the encoded predetermined value through a load modulating circuit; and
control to transmit the generated in-band signal to the wireless power transmitter.

17. The wireless power receiver of claim 10, wherein the second duration is 105 milliseconds plus or minus 5 milliseconds.

18. The wireless power receiver of claim 10, wherein the predetermined time is 10 milliseconds.

* * * * *